(12) United States Patent
Okamura

(10) Patent No.: US 10,602,023 B2
(45) Date of Patent: Mar. 24, 2020

(54) DOCUMENT STATE MANAGEMENT SYSTEM, DOCUMENT STATE MANAGEMENT METHOD, AND NON-TRANSITORY COMPUTER-READABLE MEDIUM

(71) Applicant: Takao Okamura, Tokyo (JP)

(72) Inventor: Takao Okamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 15 days.

(21) Appl. No.: 16/152,446

(22) Filed: Oct. 5, 2018

(65) Prior Publication Data

US 2019/0109962 A1 Apr. 11, 2019

(30) Foreign Application Priority Data

Oct. 6, 2017 (JP) ................................. 2017-196131

(51) Int. Cl.
| | | |
|---|---|---|
| *H04N 1/44* | (2006.01) | |
| *H04N 1/32* | (2006.01) | |
| *G06F 16/93* | (2019.01) | |
| *G06T 1/00* | (2006.01) | |

(52) U.S. Cl.
CPC ............. *H04N 1/444* (2013.01); *G06F 16/93* (2019.01); *G06T 1/0021* (2013.01); *H04N 1/32144* (2013.01); *H04N 1/32149* (2013.01); *H04N 2201/323* (2013.01)

(58) Field of Classification Search
CPC .......... H04N 1/32144; H04N 2201/323; G06F 1/0021
See application file for complete search history.

(56) References Cited

U.S. PATENT DOCUMENTS

| 2001/0012410 A1 | 8/2001 | Michiie et al. |
| 2002/0040415 A1 | 4/2002 | Moteki et al. |
| 2003/0011821 A1 | 1/2003 | Obata et al. |

(Continued)

FOREIGN PATENT DOCUMENTS

| JP | 2004-070786 | 3/2004 |
| JP | 2008-181222 | 8/2008 |
| JP | 2013-015905 | 1/2013 |

*Primary Examiner* — King Y Poon
*Assistant Examiner* — Michael Burleson
(74) *Attorney, Agent, or Firm* — Oblon, McClelland, Maier & Neustadt, L.L.P.

(57) ABSTRACT

A document state management system includes circuitry configured to receive registration of a document, and a memory to store first information and second information. The first information retains identification information of the document in association with a document state relating to the document. The second information retains tracing data for tracing the document state of the document in association with the identification information of the document. The circuitry records the tracing data in a medium and output the medium. The circuitry acquires the tracing data from the medium. The circuitry acquires, from the second information, the identification information of the document associated with the tracing data acquired from the medium. The circuitry acquires, from the first information, the document state of the document associated with the identification information of the document acquired from the second information. The circuitry outputs the document state acquired from the first information.

10 Claims, 39 Drawing Sheets

(56) References Cited

U.S. PATENT DOCUMENTS

| | | |
|---|---|---|
| 2003/0132942 A1 | 7/2003 | Obata et al. |
| 2004/0109186 A1 | 6/2004 | Shindoh et al. |
| 2004/0114171 A1 | 6/2004 | Shindoh et al. |
| 2004/0125415 A1 | 7/2004 | Michiie et al. |
| 2004/0136022 A1 | 7/2004 | Kizaki et al. |
| 2004/0136032 A1 | 7/2004 | Kizaki et al. |
| 2006/0050994 A1 | 3/2006 | Michiie et al. |
| 2006/0200863 A1* | 9/2006 | Ray .................. G06F 12/145 726/24 |
| 2017/0201644 A1 | 7/2017 | Okamura |
| 2018/0011998 A1 | 1/2018 | Okamura |

\* cited by examiner

Solar Power Construction Application Form/Data Input | Exit

Solar Power Construction Application Form

| Name | Taro Yamada |
| Address | Shiga-ken … |
| TEL | 01-234-567 |
| Email | Mail@com |
| Expected Construction Date | 2000/01/02 |

332

Upload Destination

| Registration Destination 1 | Ohmi Prefecture Construction Department |
| Internal Setting | Internal Database |
| External Registration Destination | Headquarter Management |
| Manual | (Please enter) |

333

Output of Sheet for Accessing Document State    ON  OFF
334

When you finish filling out application form, please press "Continue" to upload application data.

335   Enter   Cancel   Continue

List  Thumbnail

Delete

Edit

Refer

Solar Power Construction Application Form/Image Input — Exit

List   Thumbnail

Delete

Edit

Refer

◀ ▶   1/1

Solar Power Construction Application Form

Scan Application Form   [Start] — 336

Upload Destination

| Registration Destination 1 | Ohmi Prefecture Construction Department |
|---|---|
| Internal Setting | Internal Database |
| External Registration Destination | Headquarter Management |
| Manual | (Please enter) |

333

ON  OFF — 334

Output of Sheet for Accessing Document State

335 — When you finish filling out application form, please press "Continue" to upload application data.

(Enter) (Cancel) (Continue)

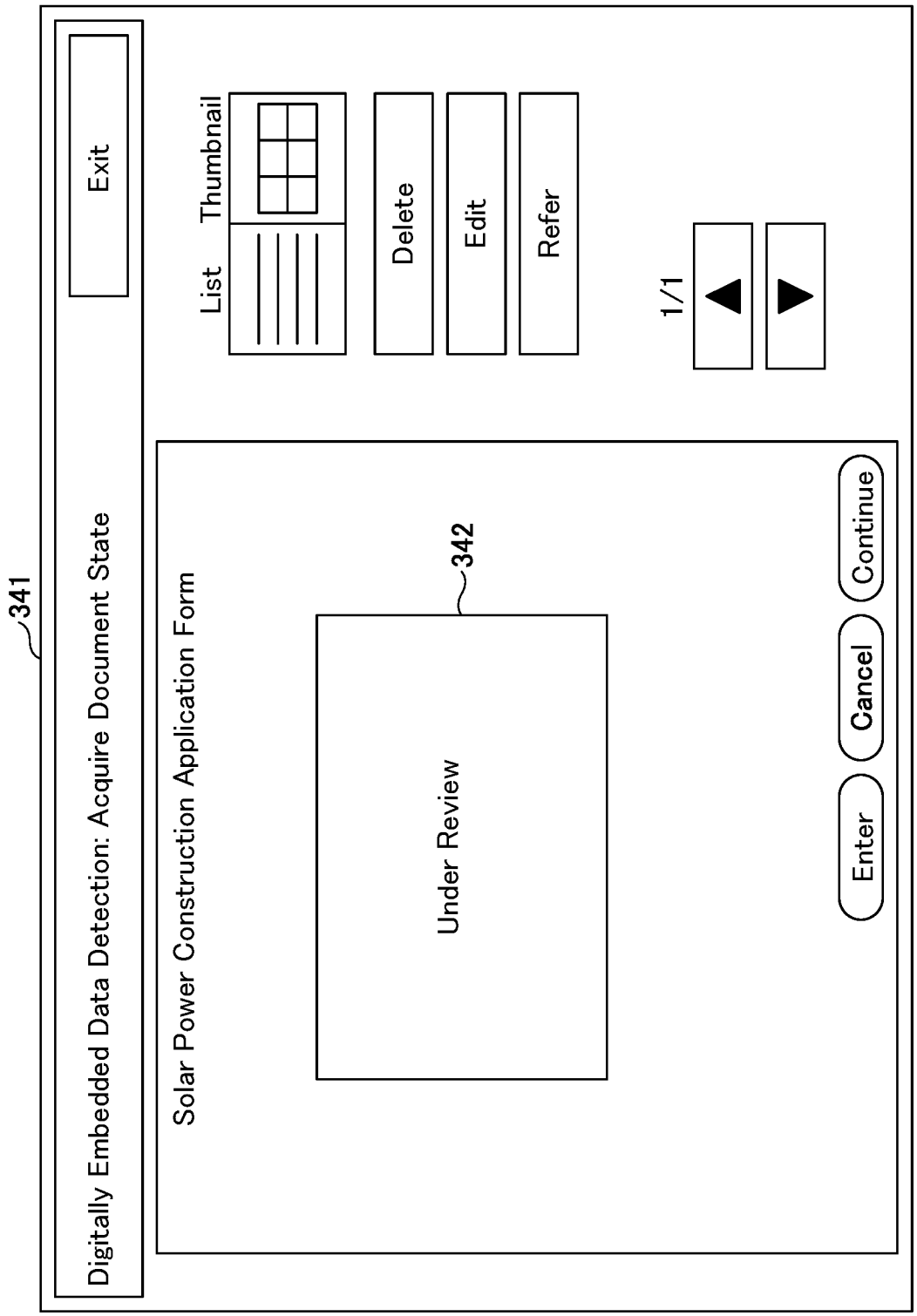

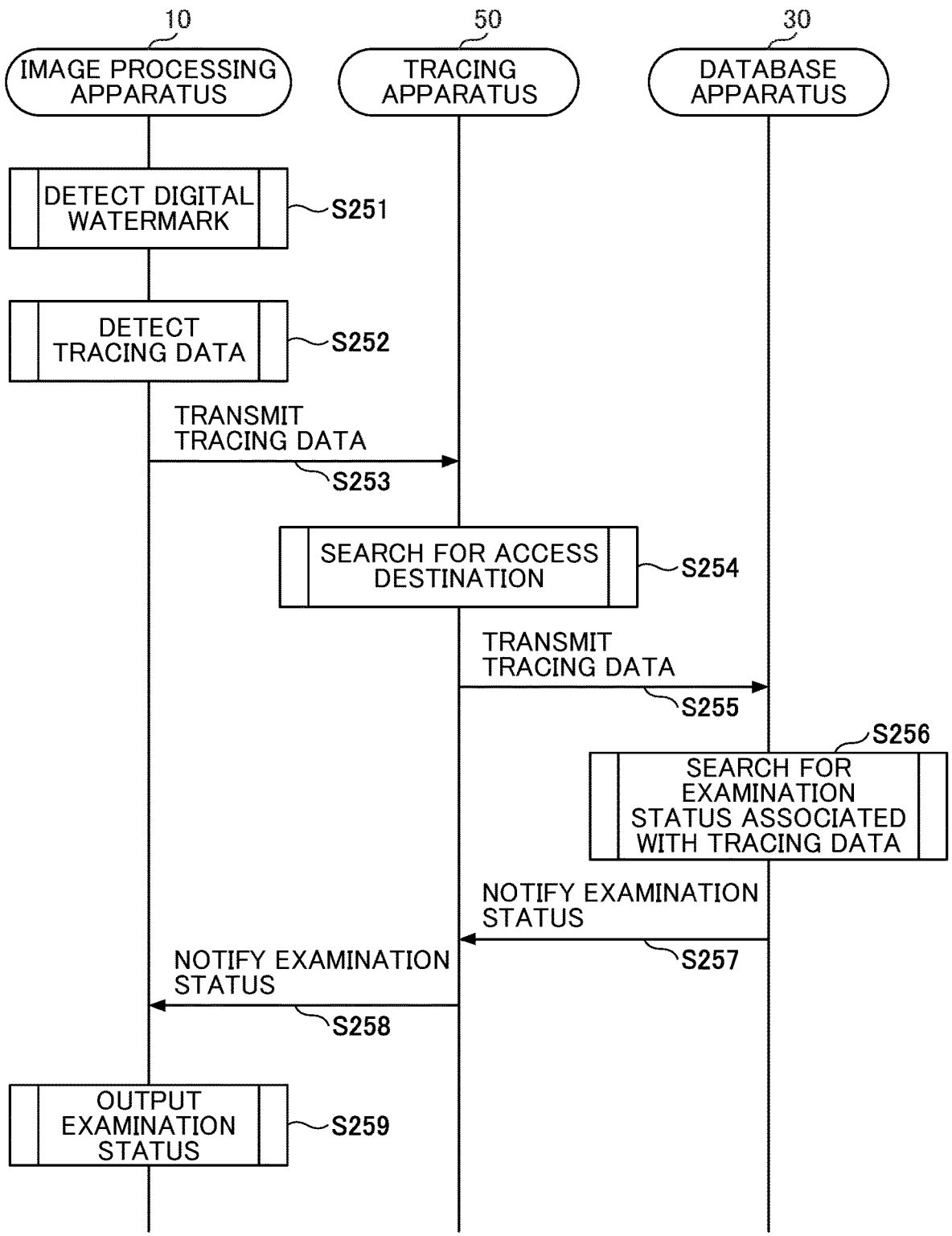

FIG. 37

A: DATA TABLE T1

| RECEIPT NO. | NAME | ADDRESS | TEL | Email | CONSTRUCTION DATE |
|---|---|---|---|---|---|
| 001 | Ichiro Tanaka | Miyagi… | 01-234-5679 | mail2@com | 2000/01/02 |
| 002 | anderson | America | 01-234-5680 | mail3@com | 2000/01/03 |
| 003 | Taro Yamada | Shiga… | 01-234-5678 | mail1@com | 2000/01/02 |
| 004 | borgle | Canada | 01-234-5681 | mail4@com | 2000/01/04 |
| 005 | Hanako Yamada | Tokyo | 01-234-5682 | mail5@com | 2000/01/05 |
| 006 | Jiro Sato | Saitama | 01-234-5683 | mail6@com | 2000/01/06 |

B: DOCUMENT STATE TABLE T2

| RECEIPT NO. | DOCUMENT ID | EXAMINATION STATUS |
|---|---|---|
| 001 | 001 | Kept |
| 002 | 002 | Destroyed |
| 003 | 003 | Under Review |
| 004 | 004 | Received |
| 005 | 005 | Approved |
| 006 | 006 | Denied |

C: DOCUMENT STATE MANAGEMENT AUTHORIZATION TABLE T3

| DOCUMENT ID | ACCESS AUTHORIZATION | TRACING DATA | USER |
|---|---|---|---|
| 001 | No | 0 | |
| 002 | No | 0 | |
| 003 | Reference/Download | 1234 | |
| 004 | No | 0 | |
| 005 | Reference | 0 | Mr. A |
| 006 | Full-Control | 0 | Administrator |

D: TRACING TABLE T4

| RECEIPT NO. | TRACING DATA | ACCESS DESTINATION |
|---|---|---|
| 001 | 1234 | 01.02.03.04 |
| 002 | 5678 | http://abc.com |
| 003 | 9999 | http://xyz.com |
| 004 | 2468 | http://aaa.com |
| 005 | 1357 | http://bbb.com |
| 006 | — | — |

FIG. 38

A: DATA TABLE　　T1

| RECEIPT NO. | NAME | ADDRESS | TEL | Email | CONSTRUCTION DATE |
|---|---|---|---|---|---|
| 001 | Ichiro Tanaka | Miyagi··· | 01-234-5679 | mail2@com | 2000/01/02 |
| 002 | anderson | America | 01-234-5680 | mail3@com | 2000/01/03 |
| 003 | Taro Yamada | Hokkaido··· | 01-234-5678 | mail1@com | 2000/01/02 |
| 004 | borgle | Canada | 01-234-5681 | mail4@com | 2000/01/04 |
| 005 | Hanako Yamada | Tokyo | 01-234-5682 | mail5@com | 2000/01/05 |
| 006 | Jiro Sato | Saitama | 01-234-5683 | mail6@com | 2000/01/06 |

B: ACCESS LOG TABLE　　T5

| RECEIPT NO. | DOCUMENT ID | NUMBER OF PRINTING | NUMBER OF EDITS | NUMBER OF COPYING |
|---|---|---|---|---|
| 001 | 001 | 0 | 0 | 0 |
| 002 | 002 | 1 | 0 | 0 |
| 003 | 003 | 0 | 0 | 0 |
| 004 | 004 | 0 | 0 | 0 |
| 005 | 005 | 0 | 1 | 0 |
| 006 | 006 | 2 | 0 | 0 |

C: ACCESS LOG MANAGEMENT AUTHORIZATION TABLE　　T6

| DOCUMENT ID | ACCESS AUTHORIZATION | TRACING CODE | USER |
|---|---|---|---|
| 001 | No | 0 | |
| 002 | No | 0 | |
| 003 | Reference/Download | 1234 | |
| 004 | No | 0 | |
| 005 | Reference | 0 | Mr. A |
| 006 | Full-Control | 0 | Administrator |

DOCUMENT STATE MANAGEMENT SYSTEM, DOCUMENT STATE MANAGEMENT METHOD, AND NON-TRANSITORY COMPUTER-READABLE MEDIUM

CROSS-REFERENCE TO RELATED APPLICATION

This patent application is based on and claims priority pursuant to 35 U.S.C. § 119(a) to Japanese Patent Application No. 2017-196131, filed on Oct. 6, 2017, in the Japan Patent Office, the entire disclosure of which is hereby incorporated by reference herein.

BACKGROUND

Technical Field

The present disclosure relates to a document state management system, a method of managing a document state, and a non-transitory computer-readable medium storing a program.

Description of the Related Art

In companies or government offices, there is a work to examine an application form submitted by an applicant and inform the applicant of an examination result later. For example, an applicant who is going to start a business that requires licenses or permits submits an application form to the authorities to obtain required licenses or permits. The applicant can start the business if the application passes the examination. In addition to the above, in many procedures such as a loan review, submission of an application form and an examination based on the application form are performed.

Generally, it takes some time before the examination is completed. The applicant often wishes to know the progress of the examination before completion of the examination. However, when the applicant wants to know the progress of the examination, the applicant has to visit a government office and submit a receipt number of the application form as a target of examination and an application date, for example, and has to prove that he or she is the applicant, to request an officer in charge to check the progress of examination. According to the request from the applicant, the officer checks the progress of the examination and informs the applicant of the progress. Although, depending on a type of the application, the applicant can check the progress of the examination by himself or herself on the Internet. However, in this case, if authentication information such as identification information of the applicant and password leaks, the third party can check the application state.

A technique of tracing a document using a digital watermark is known. As an example of a conventional technique of tracing a document using a digital watermark, a system is known in which an electronic document A is transmitted from a registrant terminal to a server and an electronic document B embedded with a digital watermark indicating inquiry information is sent back to the registrant terminal. In this system, a user can acquire the inquiry information by scanning the electronic document B using a scanner and therefore the electronic document A can be specified.

SUMMARY

A document state management system includes circuitry configured to receive registration of a document; and a memory to store first information and second information. The first information retains identification information of the document in association with a document state relating to the document. The second information retains tracing data for tracing the document state of the document in association with the identification information of the document. The circuitry records the tracing data in a medium and output the medium in which the tracing data is recorded. The circuitry acquires the tracing data from the medium. The circuitry acquires, from the second information, the identification information of the document associated with the tracing data acquired from the medium. The circuitry acquires, from the first information, the document state of the document associated with the identification information of the document acquired from the second information. The circuitry outputs the document state acquired from the first information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 29 is an illustration of an example of a registration screen displayed for registering an application form of a solar power construction through a panel input, according to an embodiment of the present disclosure;

FIG. 30 is an illustration of another example of the registration screen, according to an embodiment of the present disclosure;

FIG. 31 is an illustration of an example of an examination status screen displayed on the touch panel when the examination status is traced by causing the image processing apparatus to read an application form copy, according to an embodiment of the present disclosure;

FIG. 36 is a sequence diagram illustrating an example of steps in a process of acquiring the examination status, according to an embodiment of the present disclosure;

FIG. 37 is an illustration for describing an example of a configuration of a database, according to an embodiment of the present disclosure;

FIG. 38 is an illustration for describing an example of a configuration of a database, according to an embodiment of the present disclosure;

Figure 1:
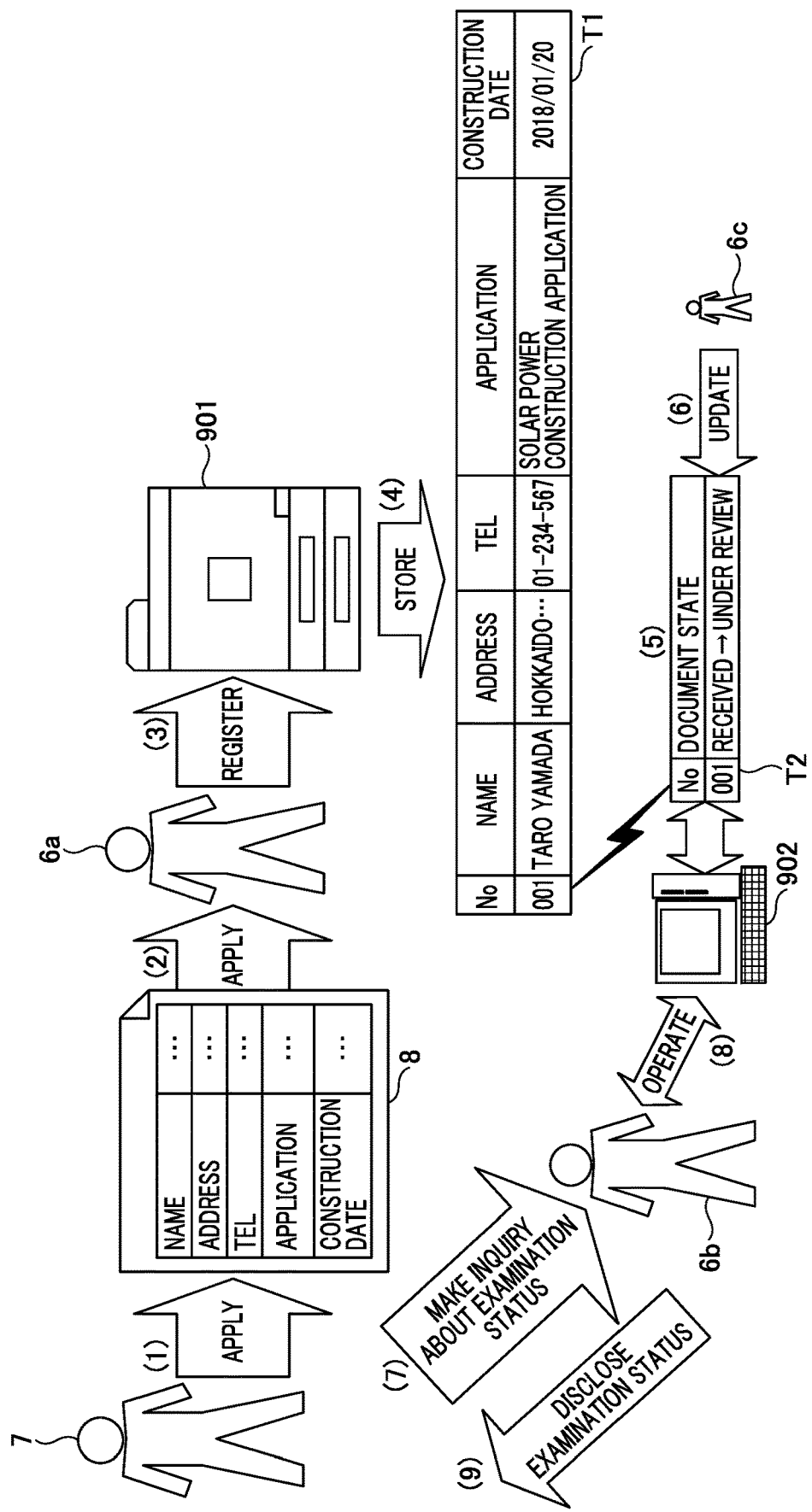
FIG. 1 is an illustration for describing an example of an operation for acquiring an examination status, according to the conventional art.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of a document state management system and a document state management operation performed by the document management system, according to an embodiment, with reference to the drawings.

Operation of Acquiring Examination Status according to Conventional Art:

Prior to describing an embodiment of the present disclosure, an operation of acquiring an examination status according to the conventional art is described. FIG. 1 is an illustration for describing an example of an operation for acquiring an examination status according to the conventional art. FIG. 1 illustrates, as an example, a flow in which an applicant submits an application for a solar power construction and acquires an examination status of the application.

(1) An applicant 7 fills in necessary information in an application form 8 by handwriting or through a web page and submits the application form 8 to the authorities.

(2) A person in charge (application receptionist 6*a*) at the authorities accepts the application form 8 in which necessary information is filled.

(3) The person in charge (application receptionist 6*a*) at the authorities registers the application form 8 in a storage device 901 for registration of an application document.

(4) The storage device 901 for registration of an application document assigns a document ID to the application form 8 and stores, in data table T1, the information filled in the application form 8 in association with the document ID.

(5) The person in charge (application receptionist 6*a*) at the authorities manages an examination status of the application form 8 in a document state management table T2. Therefore, the document state management table T2 and the data table T1 are associated with each other by the document ID.

(6) Another person in charge (examination status administrator 6*c*) at the authorities updates the examination status in the document state management table T2 as needed.

(7) When the applicant 7 wants to make an inquiry about the examination status, the applicant 7 visits an office of the authorities that received the application form 8. Another person in charge at the authorities who receives the inquiry (inquiry receptionist 6*b*) has to confirm whether the person who made the inquiry is the applicant himself/herself by reviewing an identification card or the like.

(8) The person in charge (inquiry receptionist 6*b*) searches the document state management table T2 to check the examination status.

(9) The person in charge (inquiry receptionist 6*b*) informs the applicant of the examination status as a response.

As described above, according to a conventional art, it takes time to acquire the examination status.

Figure 2:
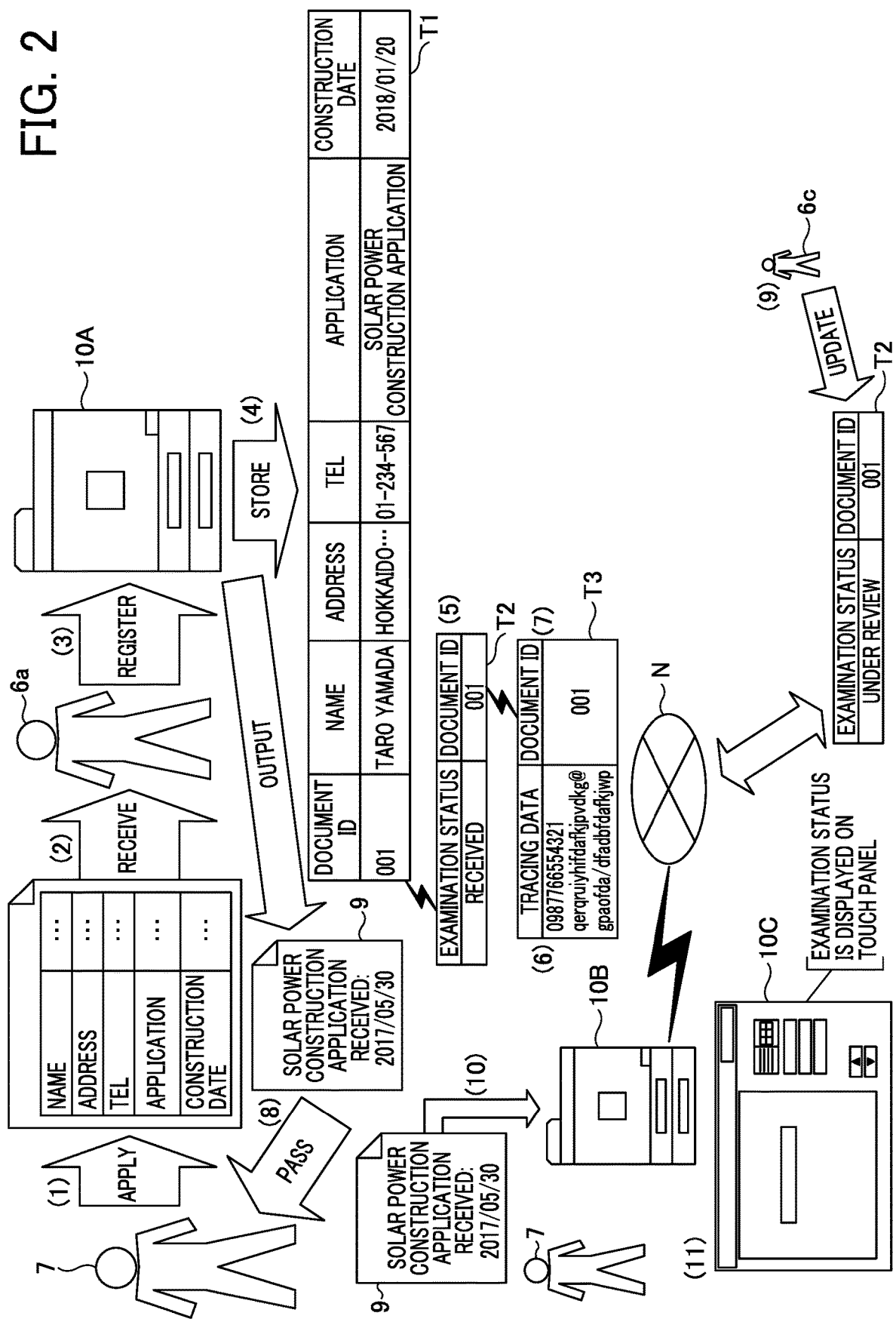
FIG. 2 is an illustration for describing an example of an operation for acquiring an examination status, according to an embodiment of the present disclosure.

Operation of Acquiring Examination Status according to the Present Embodiment:

FIG. 2 is an illustration for describing an example of an operation for acquiring an examination status according to the present embodiment. In the following description on FIG. 2, the differences from FIG. 1 are described. The same reference numerals are given to the same or corresponding elements, functions or configurations as those of the first embodiment, and redundant descriptions thereof are omitted or simplified appropriately. The processes of (1) to (4) are the same as those of FIG. 1.

(5) An image processing apparatus 10A manages an examination status of the application form 8 in the document state management table T2. Therefore, the image processing apparatus 10A registers the document ID in the document state management table T2 to manage the examination status. In another example, a database apparatus 30 described below manages the examination status, in place of the image processing apparatus 10A.

(6) In response to receiving an input of the application form 8, the image processing apparatus 10A generates tracing data.

(7) The tracing data is data for tracing an examination status of the application form 8. The image processing apparatus 10A generates a document state management authorization table T3, in which the document ID and tracing data are associated with each other.

(8) The image processing apparatus 10A prints out an application form copy 9, on which the tracing data and access information used by an image processing apparatus 10B to access the document state management table T2 and the document state management authorization table T3 are formed as a digital watermark. The applicant keeps the application form copy 9.

(9) The person in charge at the authorities updates the examination status in the document state management table T2 as needed, in accordance with a progress of the examination.

(10) When the applicant 7 wants to make an inquiry about the examination status, the applicant 7 operates the image processing apparatus 10B to scan the application form copy 9. The image processing apparatus 10B acquires the access information and the tracing data from the digital watermark, and accesses the document state management authorization table T3 based on the access information. The image processing apparatus 10A searches the document state management authorization table T3 for tracing data that is identical to the tracing data acquired from the digital watermark. A document ID associated with the tracing data is specified. Accordingly, the document state is acquired from the document state management table T2.

(11) The image processing apparatus 10B displays the examination status of the application form on the touch panel 10C.

As described above, in the present embodiment, tracing data is registered in the document state management authorization table T3, and the tracing data is associated with an examination status in the document state management table T2 using the document ID. Further, in the present embodiment, since the tracing data is formed as a digital watermark on the application form copy 9, when the applicant 7 operates the image processing apparatus 10B to scan the application form copy 9, the applicant 7 can know the examination status of the document. Accordingly, the applicant does not have to visit an office of the authorities or the like.

The descriptions of the document state management table T2 and the document state management authorization table T3 are provided below, with reference to FIG. 37 and FIG. 38. The descriptions of other tables that relate to these tables T2 and T3 are also provided below, with reference to FIG. 37 and FIG. 38.

Terms Used in the Present Disclosure

"Identification information of a document" refers to information that uniquely specifies or identifies a document. In the present embodiment, a term "document ID" is used to describe the identification information. "ID" is an abbreviation of identification and means an identifier or identification information. ID is represented by either one or a combination of a name, a code, a character string, and a numeral value, and used for uniquely distinguishing a specific target from a plurality of objects.

A "document state" refers to information indicating at least one stage among a plurality of stages through which a document is processed. In other words, the document state indicates a degree of progress of the process. A document is supposed to be a target of a procedure. Accordingly, the document state can be regarded as a degree of progress of the procedure. In the present embodiment, since a description is given of the progress of examination (review) for an application as an example, a term "examination status" is used.

"Tracing data" refers to information used for acquiring a document state from an apparatus on a network that stores the document state. The tracing data does not indicate a uniform resource locator (URL) of the apparatus. Rather, the tracing data indicates that an authorization to access the document state is assigned.

A "medium" refers to any object that stores data. Examples of medium include a sheet medium (e.g., paper), a storage medium, such as a semiconductor or a compact disc-read only memory (CD-ROM).

Figure 3:
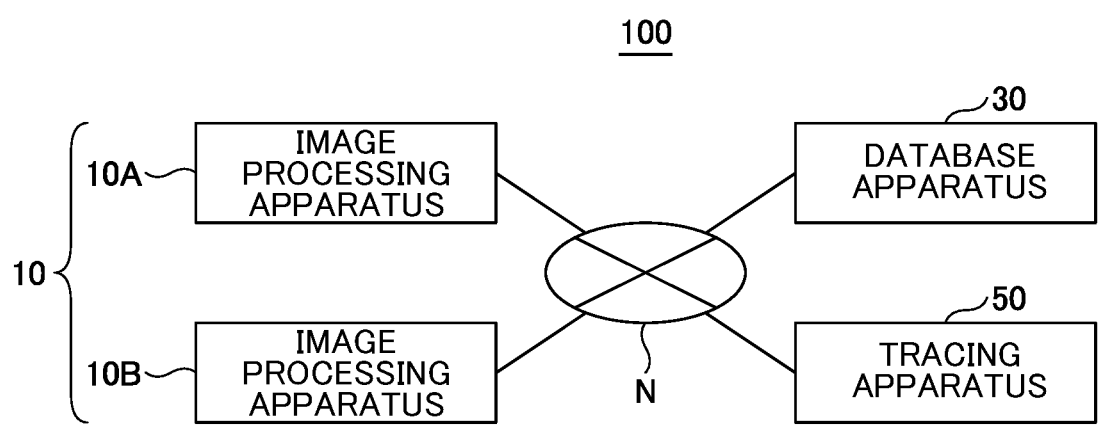
FIG. 3 is a schematic diagram illustrating an example of a system configuration of a document state management system, according to an embodiment of the present disclosure.

Example of System Configuration:

FIG. 3 is a schematic diagram illustrating an example of a system configuration of a document state management system 100. The document state management system 100 includes an image processing apparatus 10A, an image processing apparatus 10B, a tracing apparatus 50, and a database apparatus 30, which are communicative with one another via a network N.

The image processing apparatus 10A is an image processing apparatus provided in a facility that receives an application form. The image processing apparatus 10B is an image processing apparatus used for registering information relating to an application form. Although the image processing apparatus 10A and the image processing apparatus 10B are used for different purposes as described above, the image processing apparatus 10A can be used as the image processing apparatus 10B, and vice versa. Accordingly, in the following description, the image processing apparatus 10A and the image processing apparatus 10B are collectively referred to as the image processing apparatus 10, to simplify the description.

The image processing apparatus 10 can be any device or apparatus having at least a scanner function. The image processing apparatus 10 is, for example, a so-called "multifunction peripheral". The multifunction peripheral is a device or an apparatus provided with at least two of a plurality of image processing functions including, for example, a printer function, a copier function, and a facsimile function, in addition to the scanner function. The multifunction peripheral can be referred to as an MFP, a copying machine, or the like. In another example, a computer to which an external scanner is attached can be used. In still another example, a computer that acquires image data captured by a digital camera can be used. Further, the image processing apparatus 10 can include a touch panel that receives data relating to an application form. In another example, the image processing apparatus can be provided with a scanner function for registering an application form.

The database apparatus 30 is an information processing apparatus that stores an examination status of an application form (i.e., document). Specifically, the database apparatus 30 can be a personal computer (PC), a server apparatus, a workstation, or the like. However, there are cases where the image processing apparatus 10 provides at least a part of functions of the database apparatus 30.

The tracing apparatus 50 is an information processing apparatus that tracks an examination status of an application form. Each of the image processing apparatus 10 or the database apparatus 30 can also track the examination status of the application form. Specifically, the tracing apparatus 50 can be a PC, a server apparatus, a workstation, or the like. The database apparatus 30 and the tracing apparatus 50 can configure a single apparatus. In addition, functions of at least one of the database apparatus 30 and the tracing apparatus 50 can be included in the image processing apparatus 10.

Figure 4:
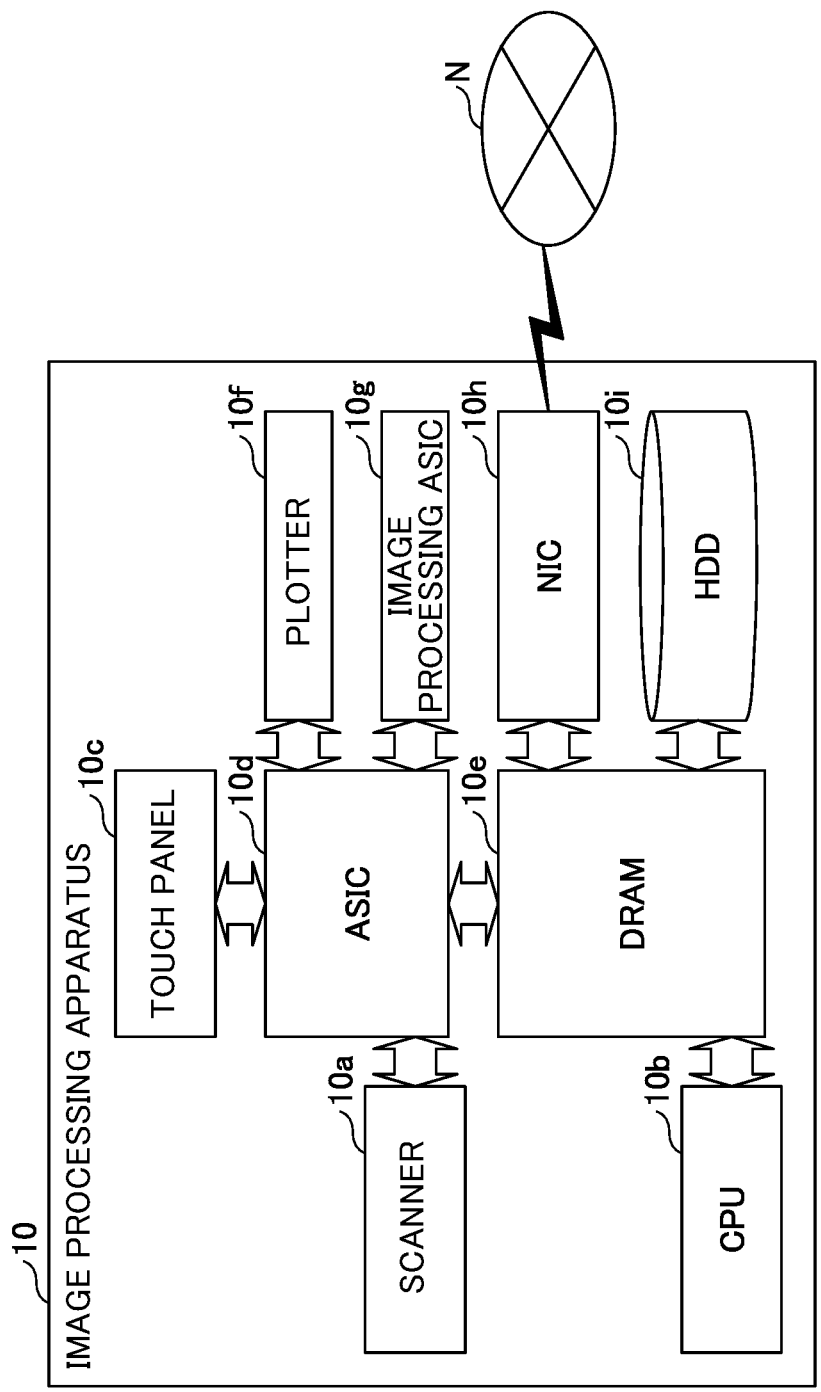
FIG. 4 is a block diagram illustrating an example of a hardware configuration of an image processing apparatus, according to an embodiment of the present disclosure.

Example of Hardware Configuration:

FIG. 4 is a block diagram illustrating an example of a hardware configuration of the image processing apparatus 10. The image processing apparatus 10 includes a touch panel 10c, a scanner 10a, a plotter 10f and an image processing application specific integrated circuit (ASIC) 10g, each of which is connected to the ASIC 10d, and a central processing unit (CPU) 10b, a network interface card (NIC) 10h and a hard disc drive (HDD) 10i, each of which is connected to a dynamic random access memory (DRAM) 10e.

The touch panel 10c receives an operation or an input of data to the image processing apparatus 10. Further, the touch panel 10c includes a display device such as a liquid crystal display and displays an execution result.

The CPU 10b executes a program loaded from the HDD 10i to the DRAM 10e to control entire operation of the image processing apparatus 10. For example, the CPU 10b controls the ASIC 10d to perform image reading, image processing, printing, or the like.

The scanner 10a optically reads a document to generate image data. Further, the scanner 10a is provided with an automatic document feeder (ADF) that automatically feeds documents, to sequentially generate image data.

The plotter 10f applies toner to a latent image formed by a laser to develop a toner image, and transfers the toner image onto paper. The toner image transferred onto paper is fixed to form an image on the paper. In another example, the image processing apparatus 10 forms an image using an inkjet method.

When image data is generated by the scanner 10a, the image processing ASIC 10g detects a digital watermark. Further, the image processing ASIC 10g performs image processing of synthesizing a digital watermark on image data to be printed by the plotter 10f.

The DRAM 10e is a volatile storage device that stores a program and data when the program is executed. The HDD 10i is a nonvolatile storage device that stores programs and data.

The NIC 10h is a communication device that connects the image processing apparatus 10 to a local area network (LAN) to allow the image processing apparatus 10 to transmit or receive data.

Figure 5:
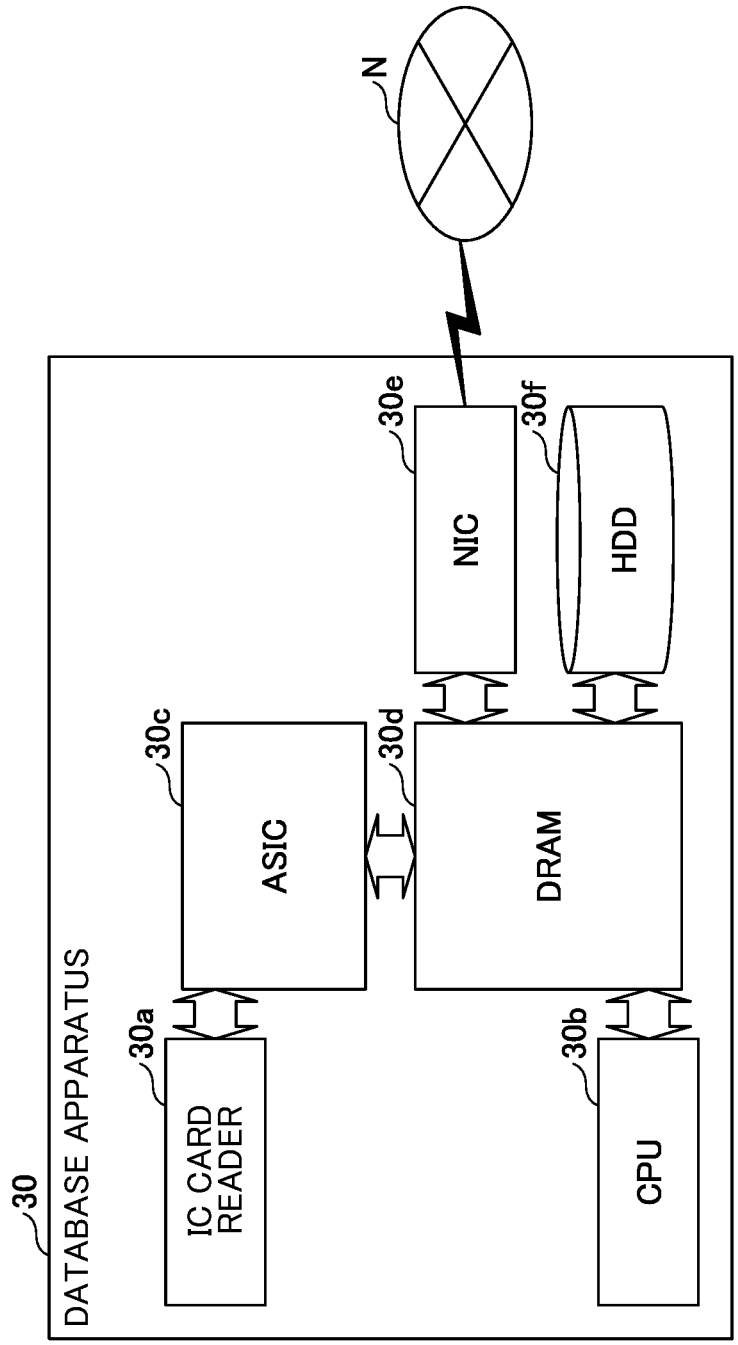
FIG. 5 is a block diagram illustrating an example of a hardware configuration of a database apparatus, according to an embodiment of the present disclosure.

FIG. 5 is a block diagram illustrating an example of a hardware configuration of the database apparatus 30. The database apparatus 30 includes an integrated circuit (IC) card reader 30a connected to an ASIC 30c, and a CPU 30b, an NIC 30e and an HDD 30f, each of which is connected to a DRAM 30d. The description provided above with reference to FIG. 4 applies to elements (members or components) of FIG. 5 having the same name as those of FIG. 4. In the following description of FIG. 5, the differences from FIG. 4 are described.

The IC card reader 30a reads data stored in an IC card. Further, the IC card reader 30a can include a writer function of writing data into an IC card. In a case where personal authentication information is stored in the IC card, an applicant can use the image processing apparatus 10 just by holding the IC card over the IC card reader 30a.

Figure 6:
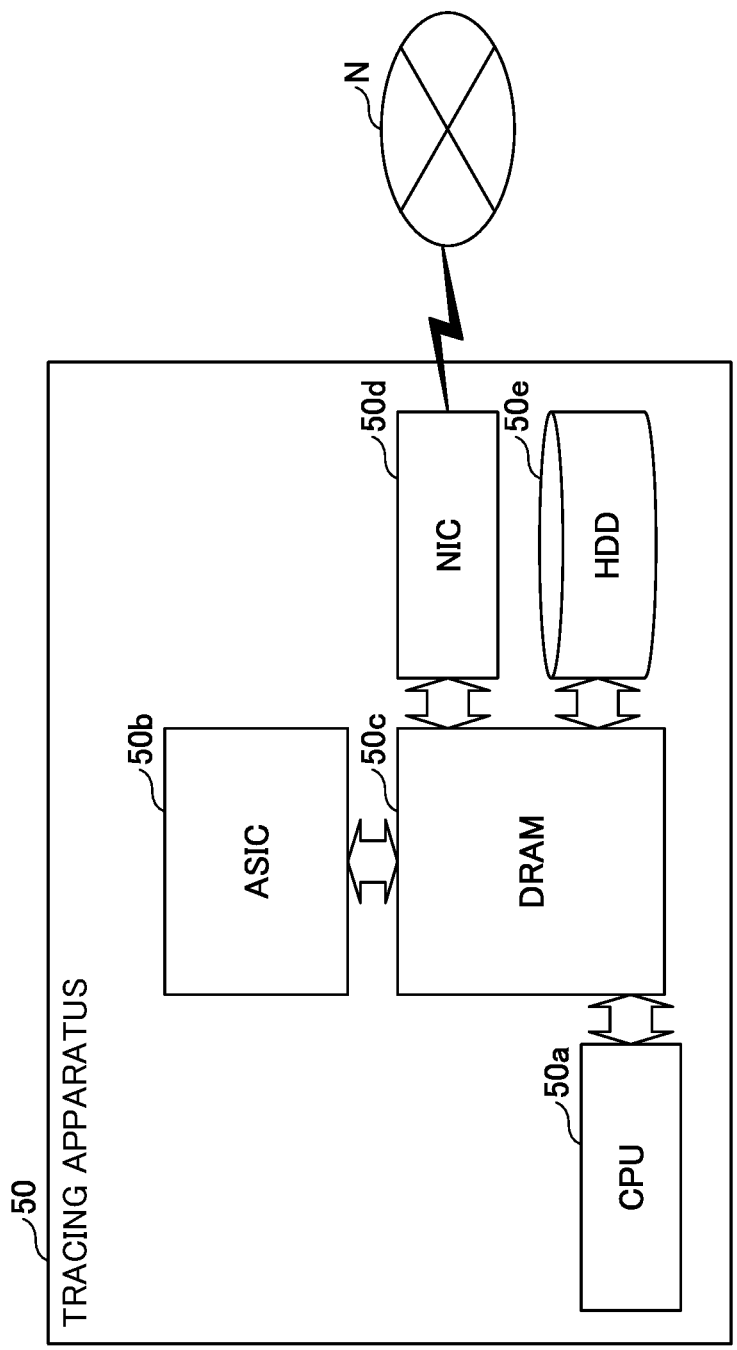
FIG. 6 is a block diagram illustrating an example of a hardware configuration of a tracing apparatus, according to an embodiment of the present disclosure.

FIG. 6 is a block diagram illustrating an example of a hardware configuration of the tracing apparatus 50. The tracing apparatus 50 includes an ASIC 50b, a CPU 50a, an NIC 50d, and an HDD 50e, each of which is connected to a DRAM 50c. The description provided above with reference to FIG. 4 applies to elements (members or components) of FIG. 6 having the same name as those of FIG. 4. In the following description of FIG. 6, the differences from FIG. 4 are described. As illustrated, the elements (members or components) of the tracing apparatus 50 are described above with reference to FIG. 4.

Figure 7:
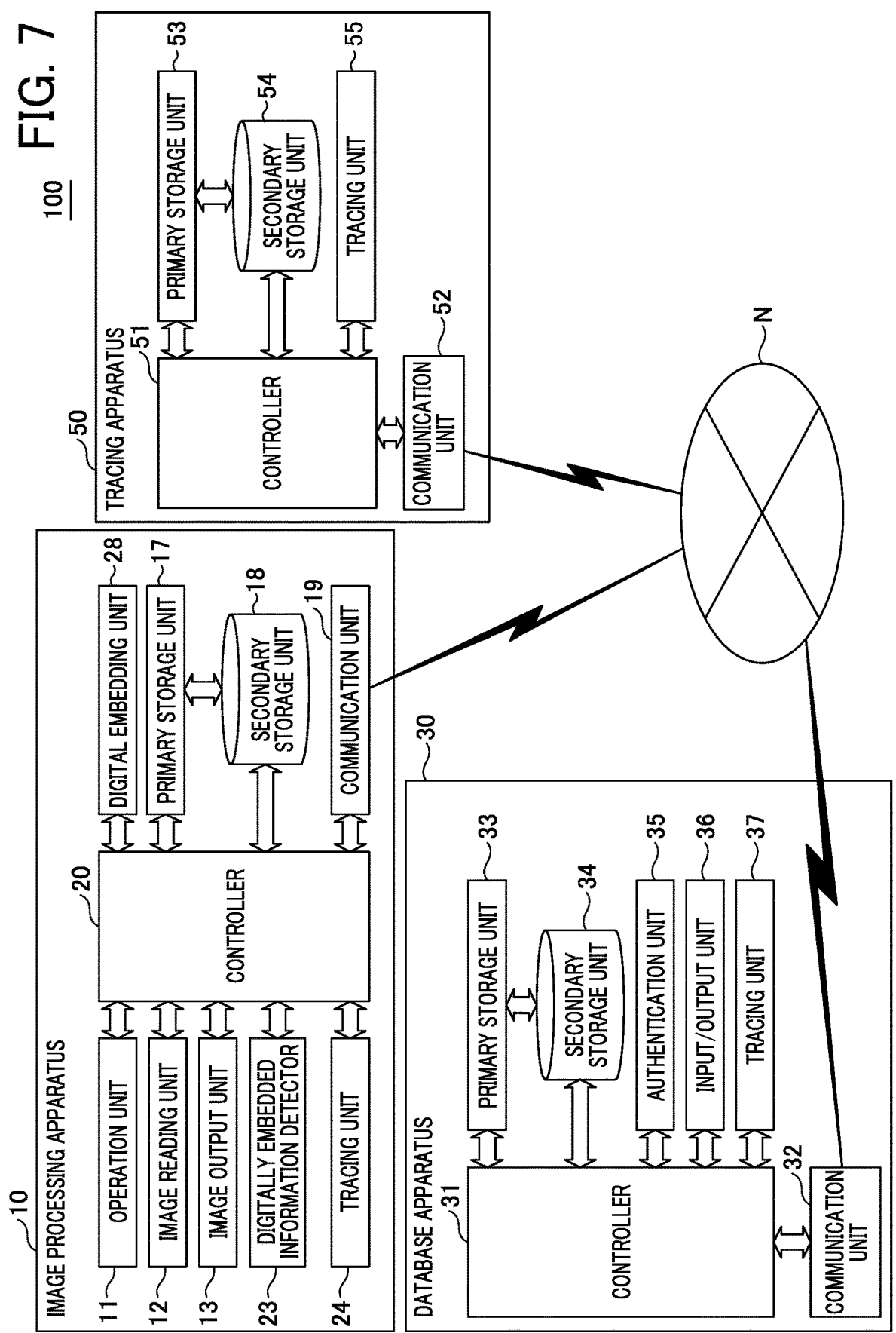
FIG. 7 is a block diagram illustrating functional configurations of the image processing apparatus, the database apparatus and the tracing apparatus of the document state management system, according to an embodiment of the present disclosure.

Functions:

FIG. 7 is a block diagram illustrating functional configurations of the image processing apparatus 10, the database apparatus 30 and the tracing apparatus 50 of the document state management system 100.

The image processing apparatus 10 includes an operation unit 11, an image reading unit 12, an image output unit 13, a digitally embedded information detector 23, a tracing unit 24, a digital embedding unit 28, a primary storage unit 17, a secondary storage unit 18, a communication unit 19, and a controller 20. These functions of the image processing apparatus 10 are functions that are implemented by operating one or more hardware elements illustrated in FIG. 4 in cooperation with instructions of the CPU 10b according to a program stored in the HDD 10i.

The operation unit 11 receives an operation from an applicant via the touch panel 10c or the like. Further, the operation unit 11 has a function of displaying information, which is implemented by a liquid crystal display or the like.

The image reading unit 12 receives an input of image data. Specifically, the image reading unit 12 controls the scanner 10a to read a document, thereby generating image data of an application form or the application form copy 9. The image output unit 13 outputs the image data. Specifically, the image output unit 13 controls the plotter 10f to form an image on paper based on the image data.

The digitally embedded information detector 23 detects a digital watermark from image data input by an image input unit 22. Further, the digitally embedded information detector 23 decodes the digital watermark to acquire data. Furthermore, the digital embedding unit 28 encodes data to form a digital watermark in the image data.

The primary storage unit 17 is a storage unit that stores data to be rewritten relatively in a short time. The secondary storage unit 18 is a storage unit that stores data relatively for a long time. The primary storage unit 17 can be volatile, for example. The secondary storage unit 18 can be nonvolatile.

The communication unit 19 exchanges various data or information with the database apparatus 30 or the tracing apparatus 50 via the network N. The tracing unit 24 generates tracing data as unique data. Further, the tracing unit 24 traces and detects an examination status of an application form based on the tracing data.

The controller 20 invokes or calls the functions that the image processing apparatus 10 includes to control entire operation of the image processing apparatus 10 so that necessary processing is performed as a whole.

The database apparatus 30 includes a primary storage unit 33, a secondary storage unit 34, an authentication unit 35, an input/output unit 36, a tracing unit 37, a communication unit 32, and a controller 31. These functions of the database apparatus 30 are functions that are implemented by operating one or more hardware elements illustrated in FIG. 5 in cooperation with instructions of the CPU 30b according to a program stored in the HDD 30f.

The primary storage unit 33, the secondary storage unit 34, the tracing unit 37, the controller 31, and the communication unit 32 implement the similar or the substantially the similar functions as the primary storage unit 17, the secondary storage unit 18, the tracing unit 24, the controller 20, and the communication unit 19 of the image processing apparatus 10. The authentication unit 35 confirms whether an applicant is authorized to use the document state management system 100. Specifically, the authentication unit 35 compares information stored in the IC card with information stored in the primary storage unit 33 or the secondary storage unit 34. When the comparison result indicates that, in the primary storage unit 33 or the secondary storage unit 34, there is information that matches the information stored in the IC card, the authentication unit 35 determines that the applicant has an authorization to use the document state management system 100. The input/output unit 36 performs input and output of data to and from the database apparatus 30.

The tracing apparatus 50 includes a primary storage unit 53, a secondary storage unit 54, a tracing unit 55, a communication unit 52, and a controller 51. These functions of the tracing apparatus 50 are functions that are implemented by operating one or more hardware elements illustrated in FIG. 6 in cooperation with instructions of the CPU 50a according to a program stored in the HDD 50e. The primary storage unit 53, the secondary storage unit 54, the tracing unit 55, the controller 51, and the communication unit 52 implement the similar or the substantially the similar functions as the primary storage unit 17, the secondary storage unit 18, the tracing unit 24, the controller 20, and the communication unit 19 of the image processing apparatus 10.

Figure 8:
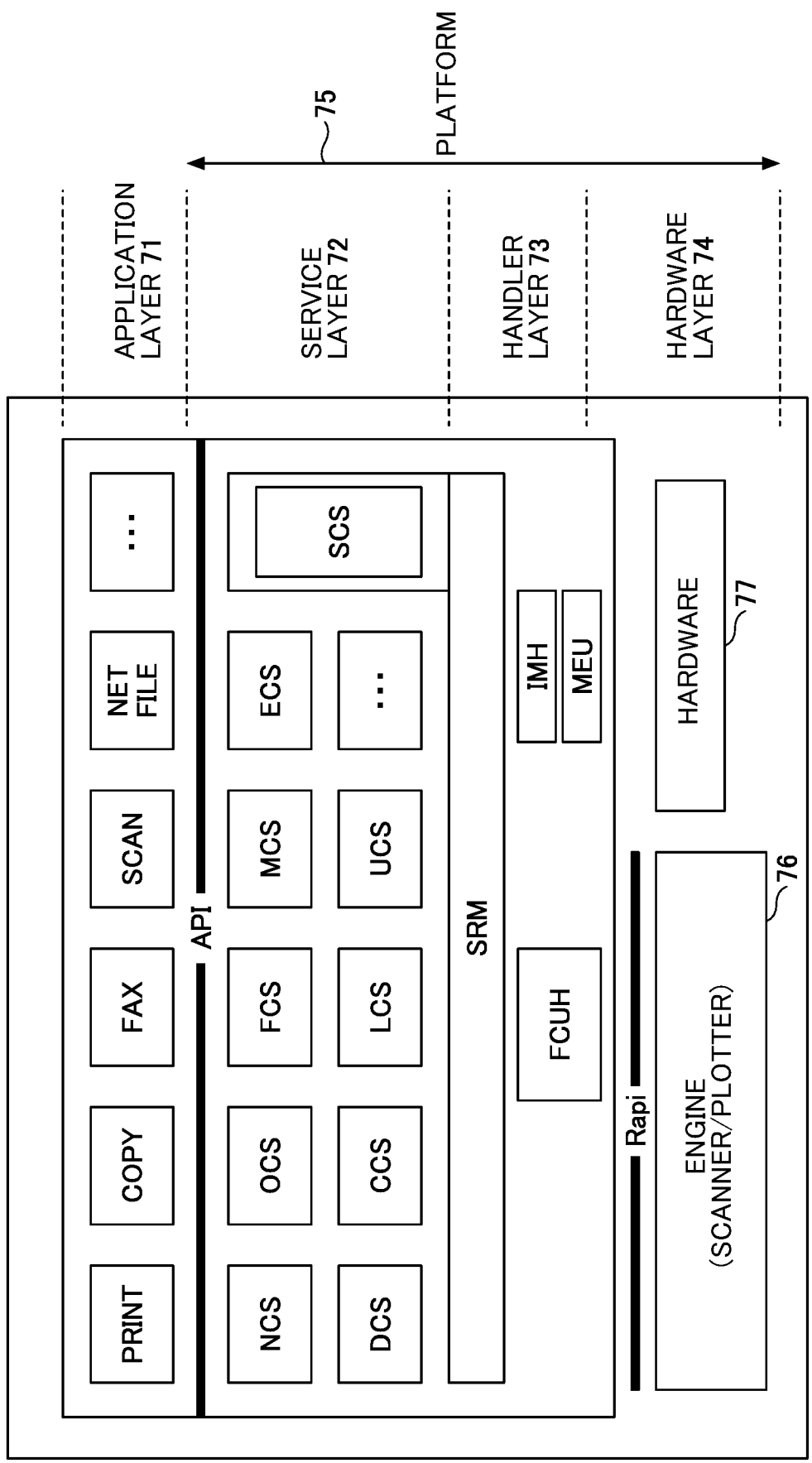
FIG. 8 is a block diagram illustrating an example of a software configuration of the image processing apparatus, according to an embodiment of the present disclosure.

Software Configuration:

FIG. 8 is a block diagram illustrating an example of a software configuration of the image processing apparatus 10. The software of the image processing apparatus 10 has a layer structure. Specifically, the software of the image processing apparatus 10 includes an application layer 71, a service layer 72, a handler layer 73, and a hardware layer 74, from the upper layer. The service layer 72, the handler layer 73, and the hardware layer 74 are collectively referred to as a platform 75.

The application layer 71 includes software that controls applications that the image processing apparatus 10 includes. In response to receiving an instruction or a setting request from an operation screen, the software sends a request to the platform 75 to implement a function of each application.

The service layer 72 controls functions that the image processing apparatus 10 includes, such as an input function, an output function, a user authentication function, a digital embedding function, a digitally embedded information detection function, and a communication function.

The handler layer 73 controls writing and reading of data to and from the primary storage unit 17 and the secondary storage unit 18. Further, the handler layer 73 controls hardware devices belonging to the hardware layer 74. In other words, the handler layer 73 controls an engine (scanner/plotter) 76 to perform input and output of image data. Further, the handler layer 73 controls hardware 77, which is a hardware resource(s) other than the engine (scanner/plotter) 76, to communicate data with an external apparatus or device.

The hardware layer 74 includes the engine (scanner/plotter) 76 and the hardware 77, which is a hardware resource(s) other than the engine (scanner/plotter) 76. The hardware layer 74 provides functions of the image processing apparatus 10 through actual mechanical and physical operations.

Figure 9:
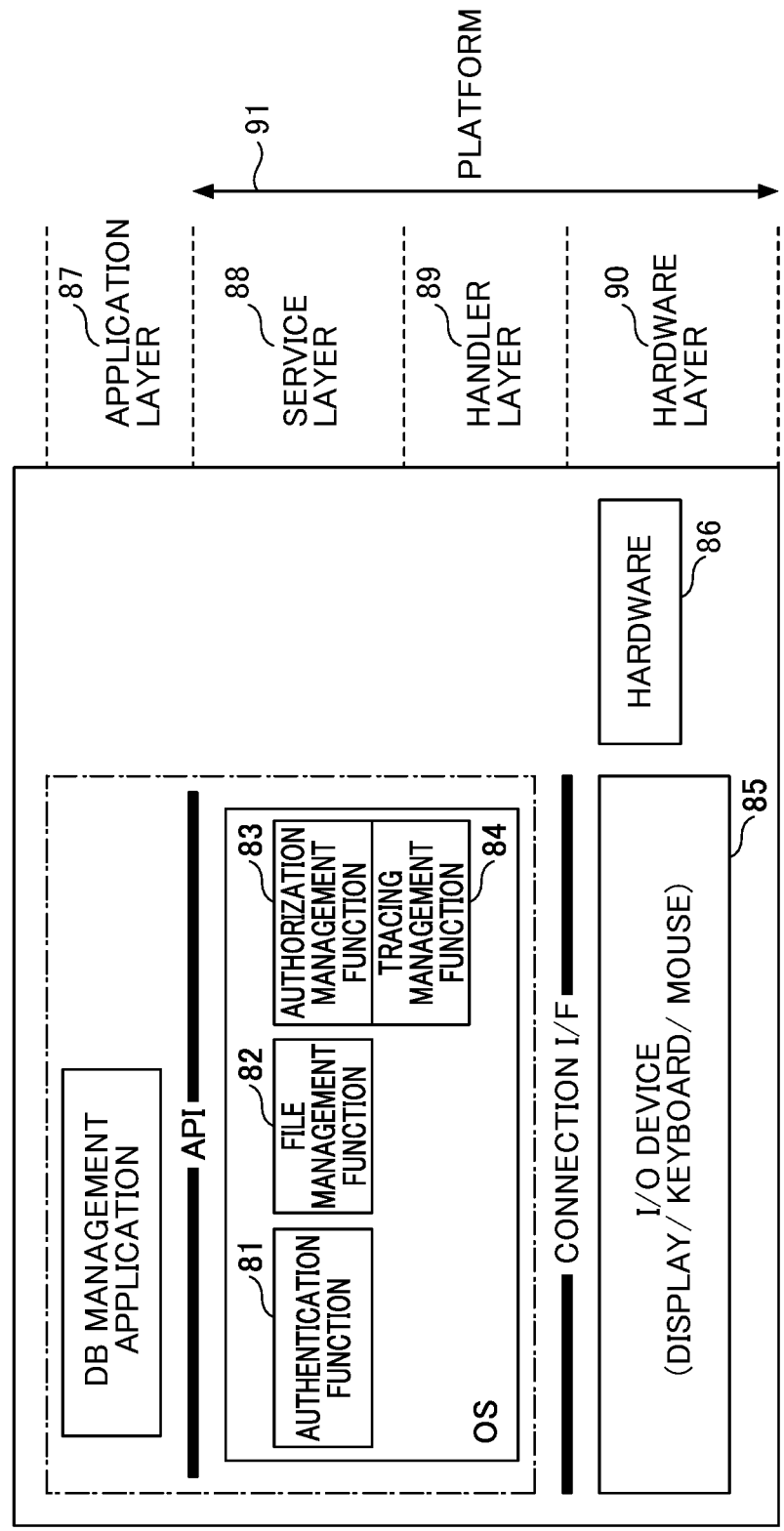
FIG. 9 is a block diagram illustrating an example of a software configuration of the database apparatus, according to an embodiment of the present disclosure.

FIG. 9 is a block diagram illustrating an example of a software configuration of the database apparatus 30. The software of the database apparatus 30 has a layer structure. Specifically, the software of the database apparatus 30 includes an application layer 87, a service layer 88, a handler layer 89, and a hardware layer 90, from the upper layer. The service layer 88, the handler layer 89, and the hardware layer 90 are collectively referred to as a platform 91.

The application layer 87 includes software that compiles control performed by the database apparatus 30. In response to receiving a setting request, the software sends a request to the platform 91 to implement a function of an application.

The service layer 88 is contained in an operating system (OS). The service layer 88 controls various functions including an authentication function 81, a file management function 82, an authorization management function 83, and a tracing management function 84. The handler layer 89 is also contained in the OS. The handler layer 89 controls writing and reading of data to and from the primary storage unit 33 and the secondary storage unit 34. Further, the handler layer 89 controls hardware belonging to the hardware layer 90. For example, the handler layer 89 controls an input/output (I/O) device 85 such a display, a keyboard, or a mouse to receive an input or display an output result. Further, the handler layer 89 controls hardware 86, which is a hardware device(s) other than the I/O device 85.

The hardware layer 90 includes the I/O device 85 (display/keyboard/mouse) and the hardware 86, which is a hardware device(s) other than the I/O device 85. The hardware layer 90 provides functions of the database apparatus 30 through actual mechanical and physical operations.

Figure 10:
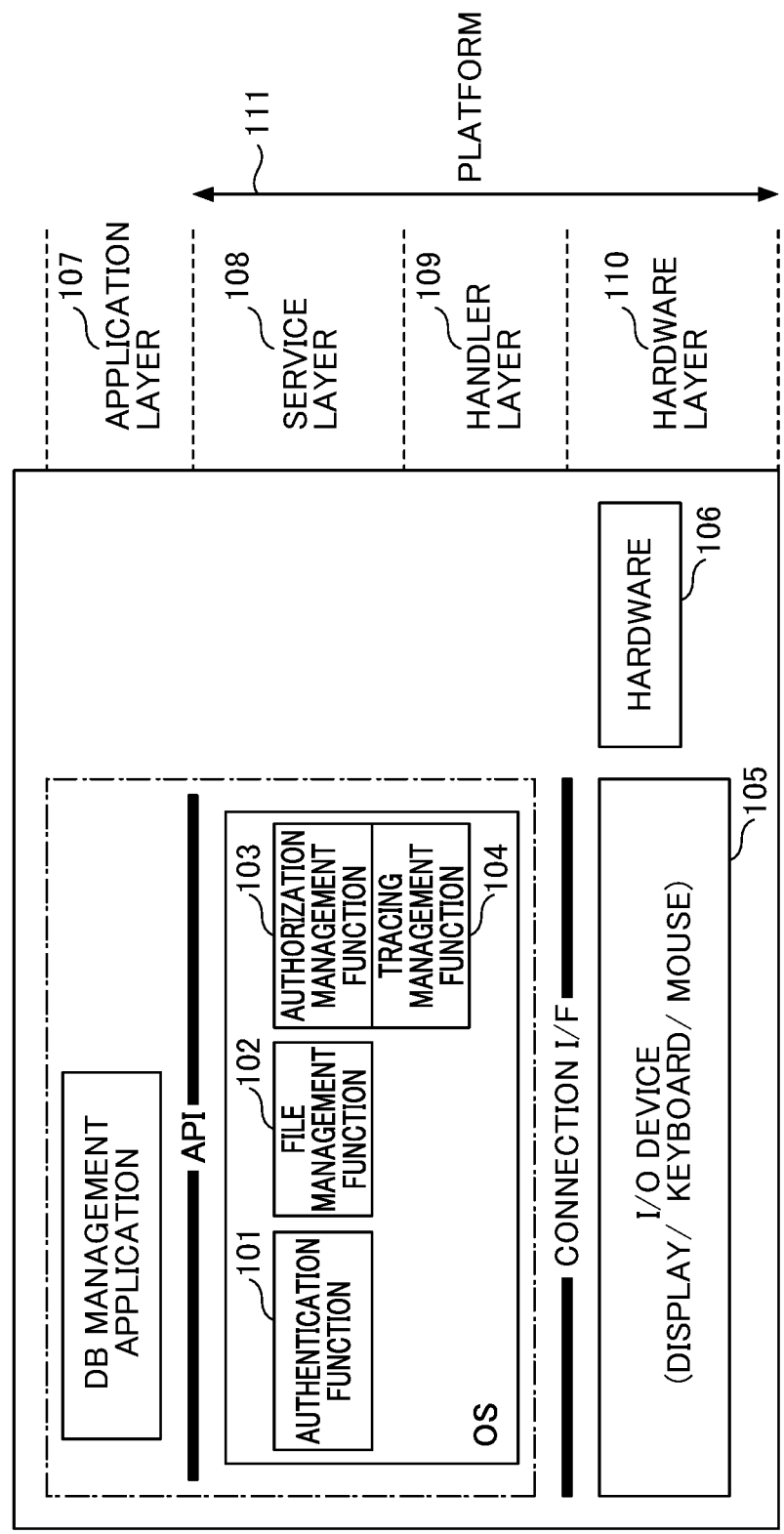
FIG. 10 is a block diagram illustrating an example of a software configuration of the tracing apparatus, according to an embodiment of the present disclosure.

FIG. 10 is a block diagram illustrating an example of a software configuration of the tracing apparatus 50. The software of the tracing apparatus 50 has a layer structure. Specifically, the software of the tracing apparatus 50 includes an application layer 107, a service layer 108, a handler layer 109, and a hardware layer 110, from the upper layer. The service layer 108, the handler layer 109, and the hardware layer 110 are collectively referred to as a platform 111.

The application layer 107 includes software that compiles control performed by the tracing apparatus 50. In response to receiving a setting request, the software sends a request to the platform 111 to implement a function of an application.

The service layer 108 is contained in an OS. The service layer 108 controls various functions including an authentication function 101, a file management function 102, an authorization management function 103, and a tracing management function 104. Data managed by the tracing management function 104 include a tracing result.

The handler layer 109 is also contained in the OS. The handler layer 109 controls writing and reading of data to and from the primary storage unit 53 and the secondary storage unit 54. Further, the handler layer 109 controls hardware devices belonging to the hardware layer 110. For example, the handler layer 109 controls an I/O device 105 such a display, a keyboard, or a mouse to receive an input or display an output result. Further, the handler layer 109 controls hardware 106, which is a hardware device(s) other than the I/O device 105.

The hardware layer 110 includes the I/O device 105 (display/keyboard/mouse) and the hardware 106, which is a hardware device(s) other than the I/O device 105. The hardware layer 110 provides functions of the tracing apparatus 50 through actual mechanical and physical operations.

Figure 11:
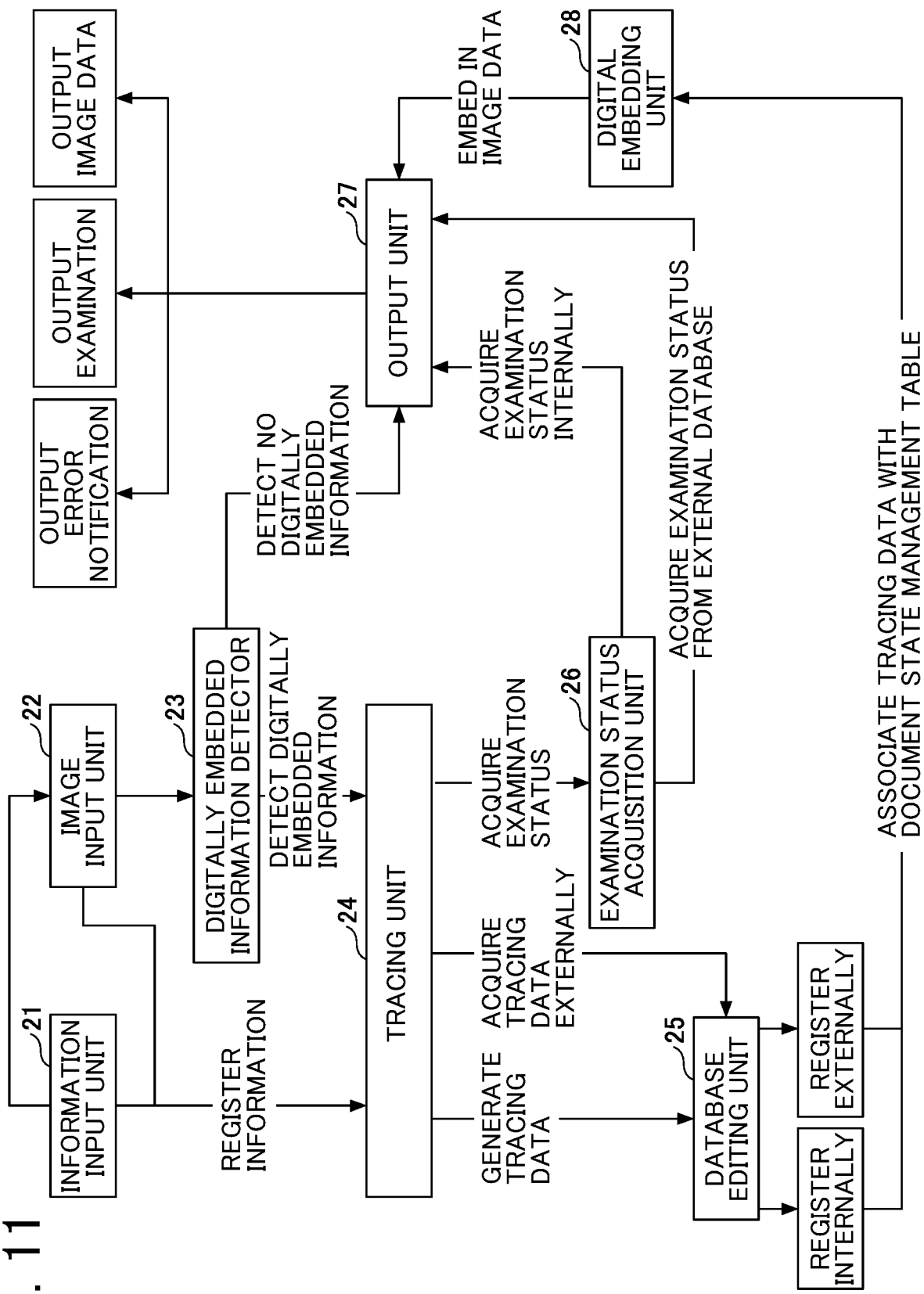
FIG. 11 is a block diagram illustrating an example of a functional configuration and an operation performed by the image processing apparatus, according to an embodiment of the present disclosure.

Operation:

FIG. 11 is a block diagram illustrating an example of a functional configuration and an operation performed by the image processing apparatus 10. An information input unit 21 receives input of various data including information to be stored in the data table T1 through the touch panel 10c. Further, the information input unit 21 also receives an input for configuring settings of the image processing apparatus 10. The information and the settings received by the information input unit 21 are stored.

The image input unit 22 receives input of the application form copy 9 and an image of an application form. A setting indicating whether an input of the image of the application form is required is configured in advance. When a setting for detecting a digital watermark is configured in advance, the image input unit 22 invokes the digitally embedded information detector 23. The digitally embedded information detector 23 detects a digital watermark from image data.

In response to detecting the digital watermark, the digitally embedded information detector 23 invokes the tracing unit 24 according to the detected content. When no digital watermark is detected, the digitally embedded information detector invokes an output unit 27.

The tracing unit 24 generates tracing data in a case where no digital watermark is detected. The tracing unit 24 invokes an examination status acquisition unit 26 in a case where a digital watermark is detected. In the former case, the tracing unit 24 generates unique tracing data for the application form. Alternatively, the tracing unit 24 acquires tracing data externally.

In a case where the digitally embedded information detector 23 detects the tracing data, the tracing unit 24 invokes the examination status acquisition unit 26 in order to acquire an examination status. A database editing unit 25 registers, in the image processing apparatus 10, the tracing data that is generated internally or acquired externally in association with the document state management table T2. Alternatively, the database editing unit 25 registers the tracing data in the database apparatus 30 external to the image processing apparatus 10. The tracing data is registered in the document state management authorization table T3.

In response to registration of the information relating to an application form, the digital embedding unit 28 embeds the tracing data and access information in image data and invokes the output unit 27. The image data in which the tracing data and the access information are embedded is printed on the application form copy 9. In another example, only the tracing data and the access information can be printed as a digital watermark on the application form copy 9.

In a case where a registration destination of the tracing data is the image processing apparatus 10, the examination status acquisition unit 26 acquires an examination status internally from the image processing apparatus 10. By contrast, in a case where the registration destination of the tracing data is the database apparatus 30 external to the image processing apparatus 10, the examination status acquisition unit 26 accesses the database apparatus 30 to acquire an examination status.

When the examination status is acquired externally or from the image processing apparatus 10, the output unit 27 outputs the acquired examination status. In a case where the acquisition of the examination status fails, the output unit 27 outputs error information. Alternatively, the output unit 27 outputs image data in which the tracing data is formed as a digital watermark.

Figure 12:
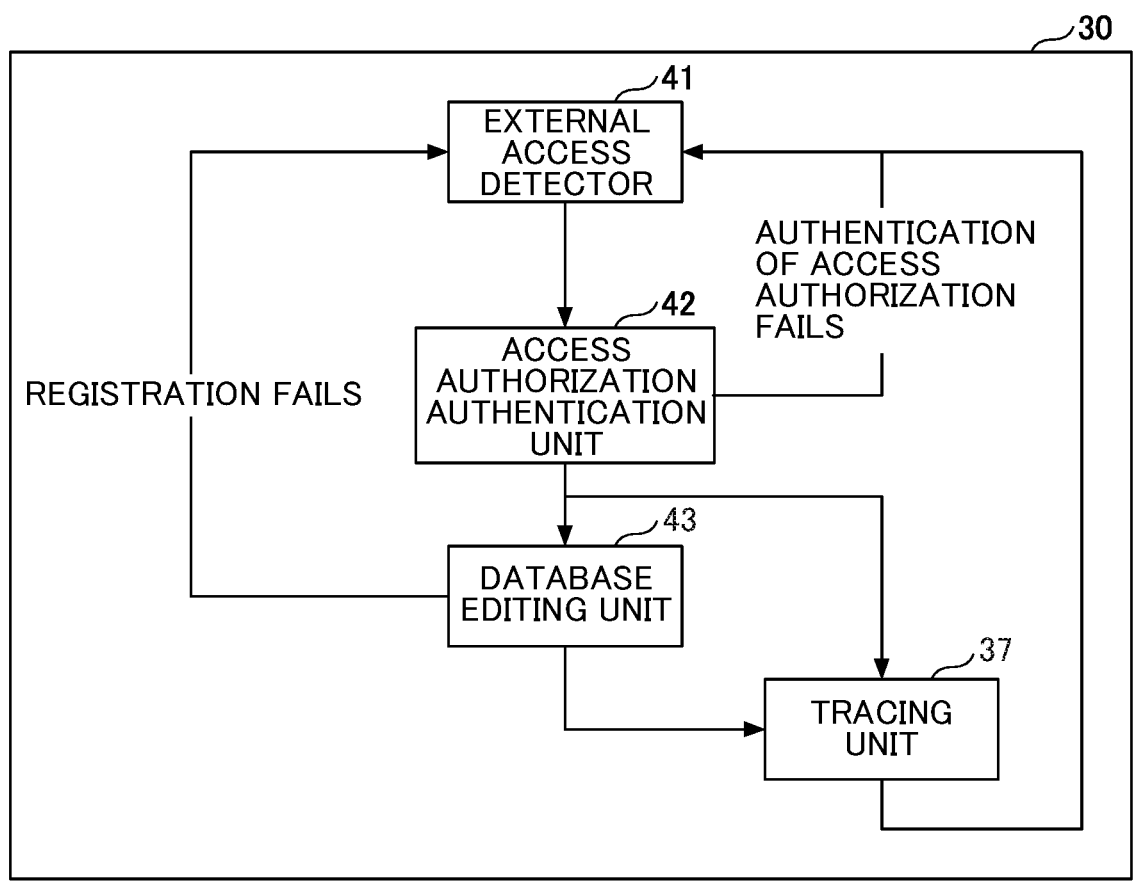
FIG. 12 is a block diagram illustrating an example of a functional configuration and an operation performed by the database apparatus, according to an embodiment of the present disclosure.

FIG. 12 is a block diagram illustrating an example of a functional configuration and an operation performed by the database apparatus 30. An external access detector 41 determines whether access to the database apparatus 30 is detected, and invokes an access authorization authentication unit 42.

The access authorization authentication unit 42 checks the presence or absence of access authorization to the database apparatus 30. The access authorization is registered in the document state management authorization table T3 together with the tracing data, and indicates that an access to a document is authorized. In the present embodiment, the access authorization is registered by registering the tracing data. In a case where there is no access right, the access authorization authentication unit 42 notifies an access authentication failure. In a case where there is an access right, the access authorization authentication unit 42 invokes a database editing unit 43 or the tracing unit 37. The access right is authentication information that the image processing apparatus 10 holds in advance. For example, the database apparatus 30 transmits a token to the image processing apparatus 10 in advance. The image processing apparatus 10 is receives authentication from the database apparatus 30 using this token.

The database editing unit 43 registers registration information relating to an application form in the data table T1. When the registration information relating to the application form is successfully registered, the database editing unit 43 invokes the tracing unit 37. When registration of the registration information fails, the database editing unit 43 notifies the external access detector 41 of registration failure.

The tracing unit 37 generates or acquires tracing data and registers the tracing data in the document state management authorization table T3 in association with a document ID. In addition, the tracing unit 37 sets, in the document state management authorization table T3, access authorization for accessing the examination status of this application form. In a case where the tracing unit 37 acquires the tracing data from the database editing unit 43, the tracing unit 37 searches the document state management authorization table T3 to identify the document ID, thereby acquiring the examination status from the document state management table T2 and sending a reply.

Figure 13:
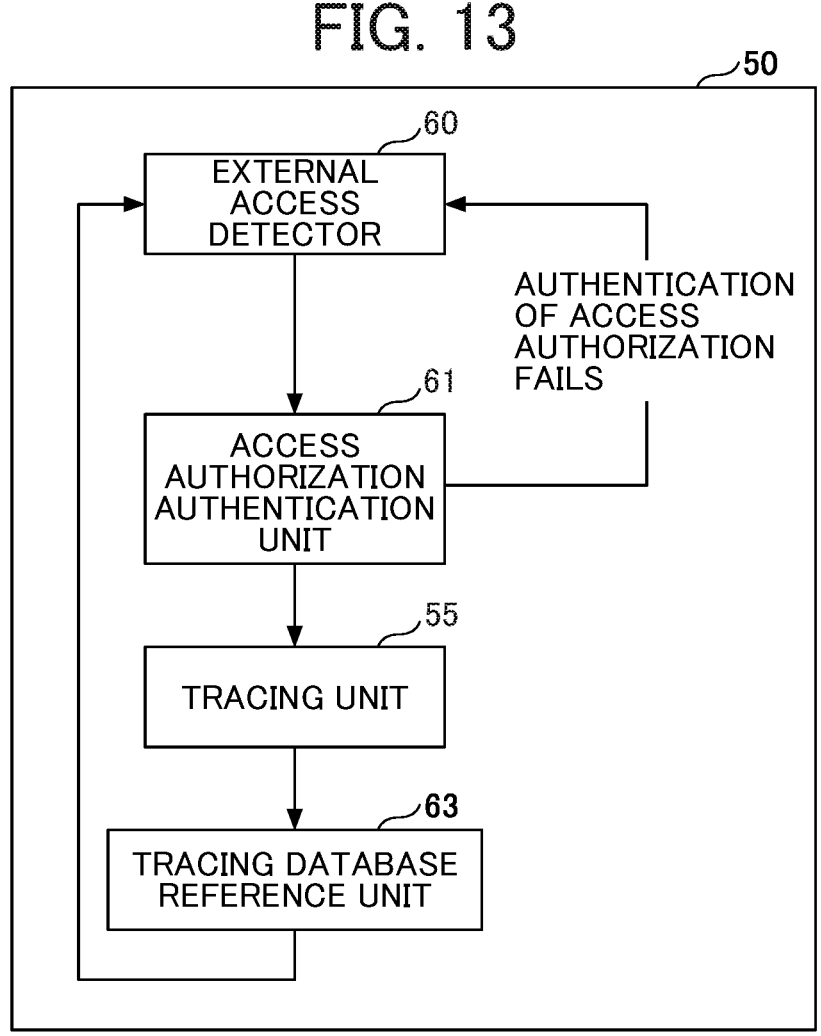
FIG. 13 is a block diagram illustrating an example of a functional configuration and an operation performed by the tracing apparatus, according to an embodiment of the present disclosure.

FIG. 13 is a block diagram illustrating an example of a functional configuration and an operation performed by the tracing apparatus 50. The external access detector 60 determines whether access to the database apparatus 30 is detected, and invokes an access authorization authentication unit 61. The access authorization authentication unit 61 implements the similar or substantially the similar function as that of the access authorization authentication unit 42 of the database apparatus 30. Further, the tracing unit 55 basically implements the similar or substantially the similar function as that of the tracing unit 24 of the image processing apparatus 10 or the tracing unit 37 of the database apparatus 30.

The tracing unit 55 of the tracing apparatus 50 invokes a tracing database reference unit 63. The tracing database reference unit 63 refers to a tracing table T4, which stores one or more pieces of unique tracing data that are generated so far, to generate new unique tracing data. Further, in a case where the tracing database reference unit 63 receives an inquiry about an examination status with the tracing data, the tracing database reference unit 63 searches the tracing table T4 for the tracing data, to acquire a place (access destination) where the document state management table T2 is present.

Figure 14:
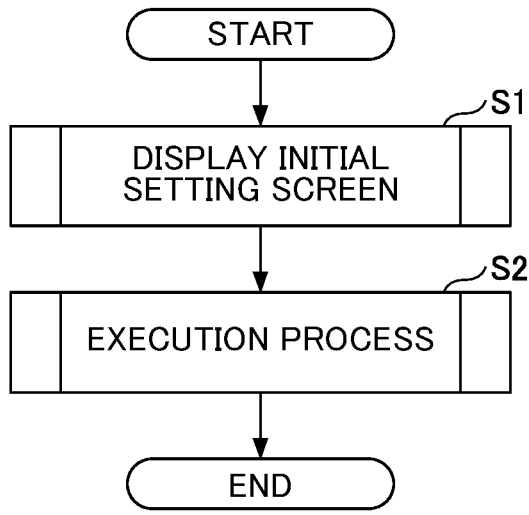
FIG. 14 is a flowchart illustrating an example of an overall operation performed by the document state management system, according to an embodiment of the present disclosure.

Operation Procedure (Overall Operation):

FIG. 14 is a flowchart illustrating an example of an overall operation performed by the document state management system 100.

First, the image processing apparatus 10 performs an initial setting process (S1). The initial setting process is a process of setting communication information for enabling the image processing apparatus 10 to access the database apparatus 30, setting a registration destination in which information relating to an application form is to be registered, setting whether to execute detection of a digital watermark, etc. Specifically, a person in charge at the authorities or the like operates the image processing apparatus 10 to configure these settings. The detailed description of the initial setting process is provided below, with reference to FIG. 15.

Next, the image processing apparatus 10 performs an execution process (S2). The execution process is a process of, in response to an input of information relating to an application form or an input of image data to the image processing apparatus 10, performing registration of information relating to an examination by the image processing apparatus 10 itself or the database apparatus 30 or performing acquisition (tracing) of the examination status. Specifically, an applicant or the like operates the image processing apparatus 10 to cause the image processing apparatus 10 to perform the execution process. The detailed description of the execution process is provided below, with reference to FIG. 18.

Figure 15:
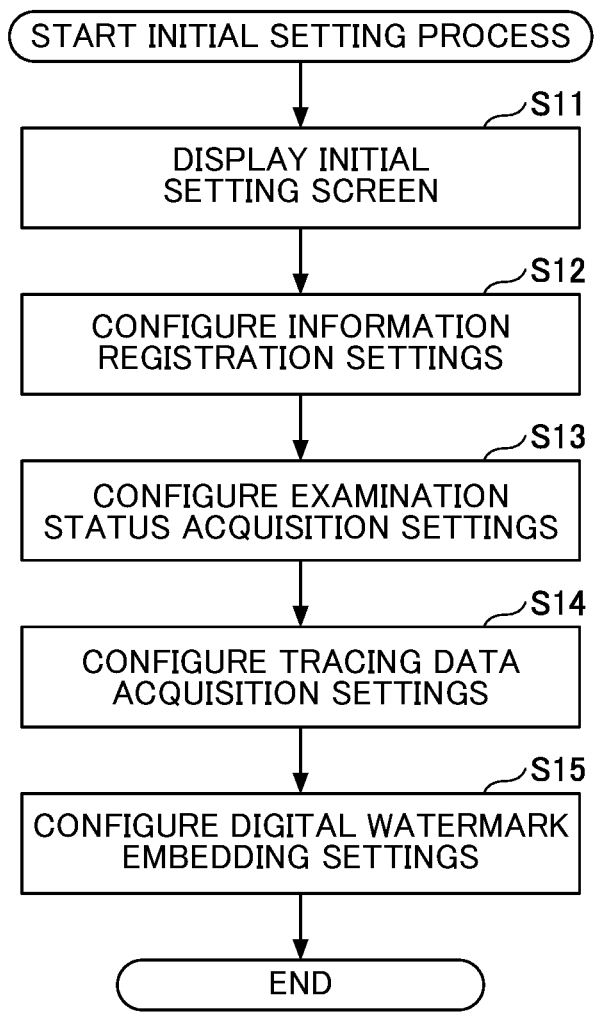
FIG. 15 is a flowchart illustrating an example of steps in an initial setting process, according to an embodiment of the present disclosure.

Initial Setting Process:

FIG. 15 is a flowchart illustrating an example of steps in the initial setting process.

The image processing apparatus 10 displays an initial setting screen 301 described later, which allows a person in charge at the authorities or the like (e.g., an administrator of the system) to configure initial settings (S11). The detailed description of the initial setting screen 301 is provided below, with reference to FIG. 16.

Next, the image processing apparatus 10 receives a setting of an information registration destination (S12). Specifically, the image processing apparatus receives a setting as to whether the information relating to an application form (data table T1) is to be registered in the image processing apparatus 10 itself or in the database apparatus 30 external to the image processing apparatus 10. In a case where the setting is configured for registering the information in the database apparatus 30, the image processing apparatus 10 receives a setting of communication information based on which the image processing apparatus 10 accesses the database apparatus 30. In the embodiment, the document state management table T2 and the document state management authorization table T3 are registered where the data table T1 is registered. Alternatively, the data table T1, the document state management table T2 and the document state management authorization table T3 are linked so that necessary information can be traced.

Next, the image processing apparatus 10 receives a setting of acquisition of an examination status (S13). Specifically, the image processing apparatus 10 receives a setting as to whether acquisition of an examination status is to be performed internally, i.e., by the image processing apparatus 10, or externally, i.e., by the database apparatus 30 or the tracing apparatus 50.

Next, the image processing apparatus 10 receives a setting of acquisition of tracing data (S14). Specifically, the image processing apparatus 10 receives a setting as to whether tracing data is to be generated by the image processing apparatus 10 or is to be acquired from the tracing apparatus 50.

Next, the image processing apparatus 10 receives a setting of a digital watermark (S15). Specifically, the image processing apparatus 10 receives a setting as to whether, when outputting image data in which tracing data is embedded as a digital watermark after the registration of information relating to an application form, printing is to be performed based on the image data or the image data is to be output as electronic data.

Figure 16:
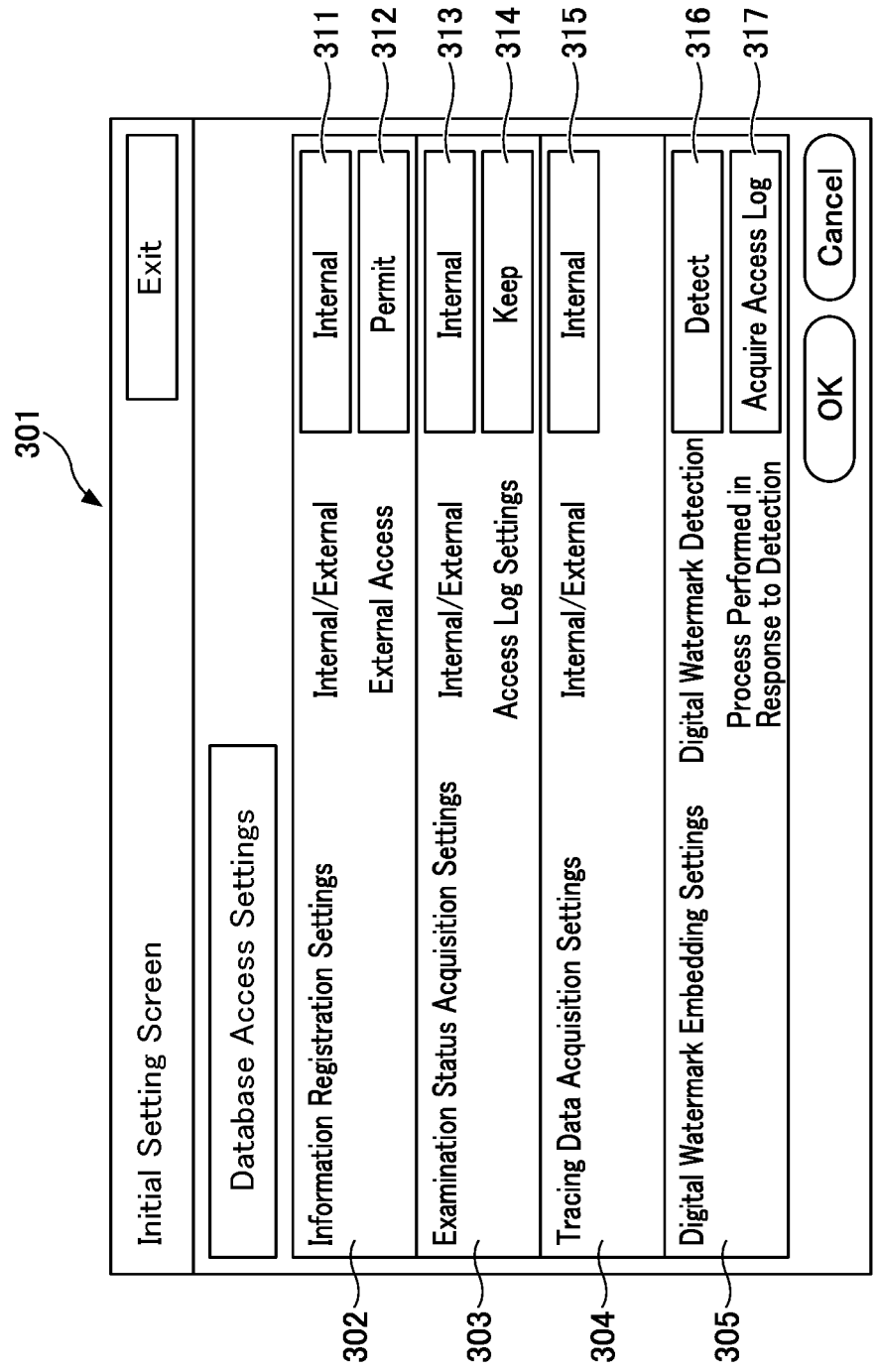
FIG. 16 is an illustration of an example of an initial setting screen displayed on a touch panel, according to an embodiment of the present disclosure.

FIG. 16 is an illustration of an example of the initial setting screen 301 displayed on the touch panel 10c. The initial setting screen 301 includes an information registration setting field 302, an examination status acquisition setting field 303, a tracing data acquisition setting field 304, and a digital watermark setting field 305.

Figure 17:
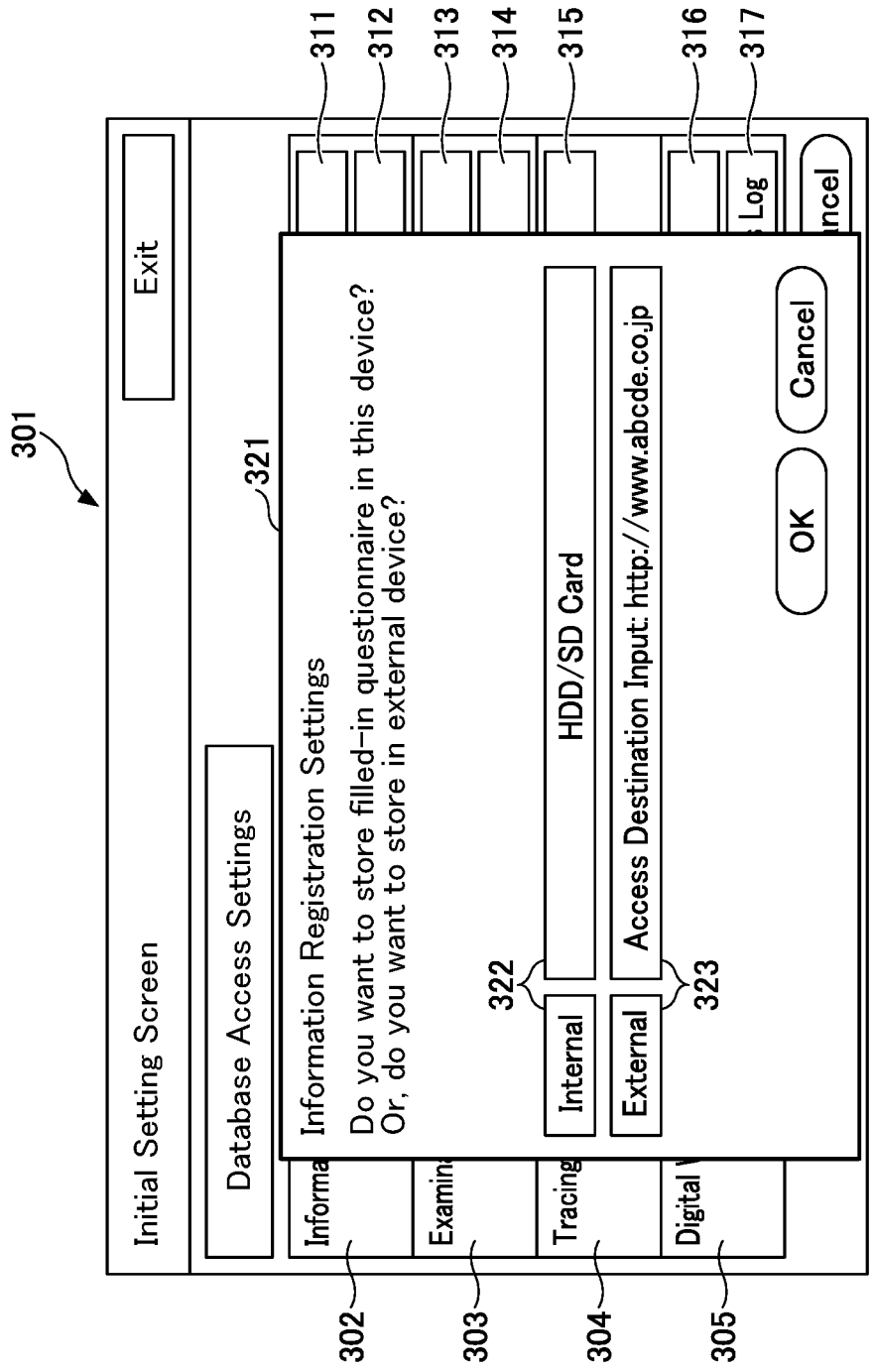
FIG. 17 is an illustration of an example of a pop-up screen, which is displayed when a registration destination button is pressed on the initial setting screen of FIG. 16.

The information registration setting field 302 includes a registration destination button 311 that receives a setting as to whether the information relating to an application form is to be registered internally (i.e., in the image processing apparatus 10) or externally in the database apparatus 30. Alternatively, a setting can be configured such that the registration destination is manually selected each time of registration of the information relating to an application form. The information registration setting field 302 further includes a permission button 312 that receives a setting as to whether an access from the outside is to be permitted, in a case where the information relating to an application form is registered internally in the image processing apparatus 10. When the registration destination button 311 is pressed, a pop-up screen 321 is displayed as illustrated in FIG. 17. The pop-up screen 321 receives a setting of a registration destination in which the information relating to an application form is to be registered.

The examination status acquisition setting field 303 includes a management destination setting button 313 that receives a setting as to whether management (acquisition) of an examination status is to be performed internally by the image processing apparatus 10 or externally by the database apparatus 30 or the tracing apparatus 50. In addition, the examination status acquisition setting field 303 includes an access log setting button 314 that receives a setting as to whether an access log is to be kept. In a case where the information relating to an application form is to be registered in the image processing apparatus 10 and an examination status of the application form is to be managed externally, the setting of acquisition of examination status is set to "External". The access log records a history of printing, editing, and copying of documents. Recording the access log is optional.

The tracing data acquisition setting field 304 includes a tracing data button 315 that receives a setting as to whether generation of tracing data is to be performed internally by the image processing apparatus 10 or externally by the database apparatus 30 or the tracing apparatus 50.

The digital watermark setting field 305 includes a detection button 316 and a processing button 317. The detection button 316 receives a setting as to whether detection of a digital watermark is to be performed. The processing button 317 receives a setting as to which processing is to be executed in response to detection of a digital watermark. In an example of FIG. 16, on the processing button 317, acquisition of an access log is set as a processing to be performed in response to detection of a digital watermark.

FIG. 17 is an illustration of an example of the pop-up screen 321, which is displayed when the registration destination button 311 is pressed on the initial setting screen 301 of FIG. 16. The pop-up screen 321 includes a storage destination setting field 322 and an access destination setting field 323. The storage destination setting field 322 receives a setting of a storage destination in which the information relating to an application form is to be stored, in a case where the information is to be registered internally in the image processing apparatus 10. The access destination setting field 323 receives a setting of an access destination (communication destination), in a case where the information is to be registered externally. The person in charge at the authorities can set an appropriate storage destination or access destination.

Figure 18:
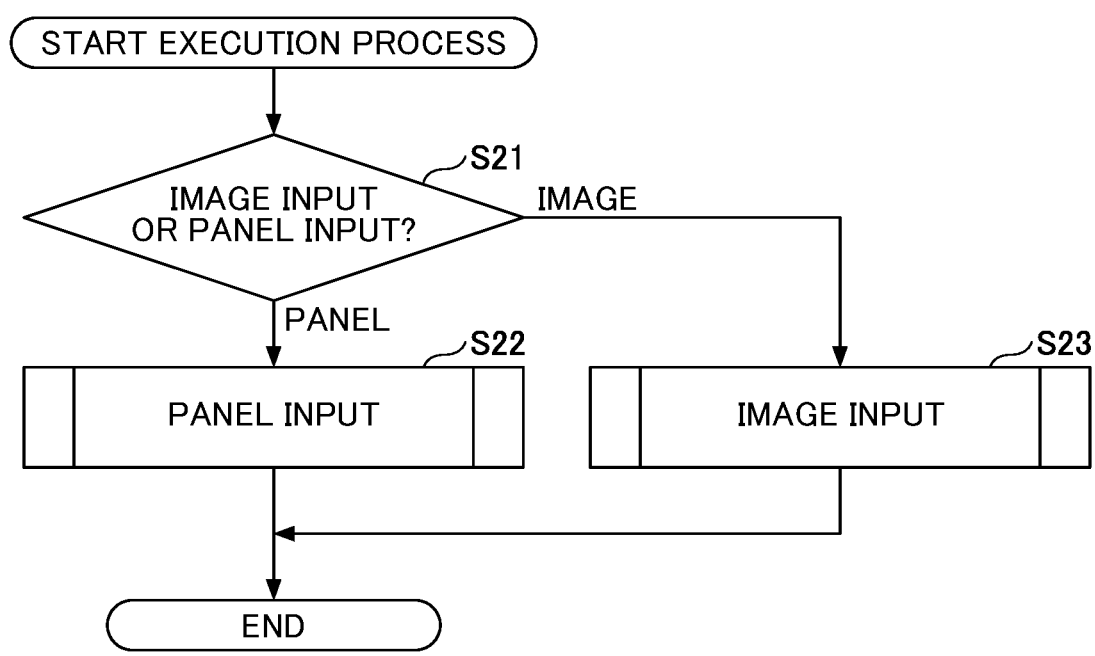
FIG. 18 is a flowchart illustrating an example of an operation performed when an applicant or a person in charge at the authorities starts operating the image processing apparatus, according to an embodiment of the present disclosure.

Processing at Start of Operation:

FIG. 18 is a flowchart illustrating an example of operation performed when an applicant or a person in charge at the authorities starts operating the image processing apparatus 10.

When an applicant or a person in charge at the authorities starts operating the image processing apparatus 10, the information input unit 21 or the image input unit 22 of the image processing apparatus 10 determines whether panel input or image input is to be performed (S21). This determination is made appropriately based on the content of operation by the applicant or the person in charge at the authorities.

In a case where the determination result indicates that the panel input is to be performed, the information input unit 21 receives a panel input (S22). The panel input includes entering information relating an application form on the touch panel 10c, configuring settings to access the database apparatus 30, and inputting data to the database apparatus 30. The detailed description of the panel input is provided below, with reference to FIG. 19.

In a case where the determination result indicates that the image input is to be performed, the image input unit 22 performs an image input (S23). The image input is a process performed when an application form or the application form copy 9 on which a digital watermark is formed is read (scanned). The detailed description of the image input process is provided below, with reference to FIG. 23.

Figure 19:
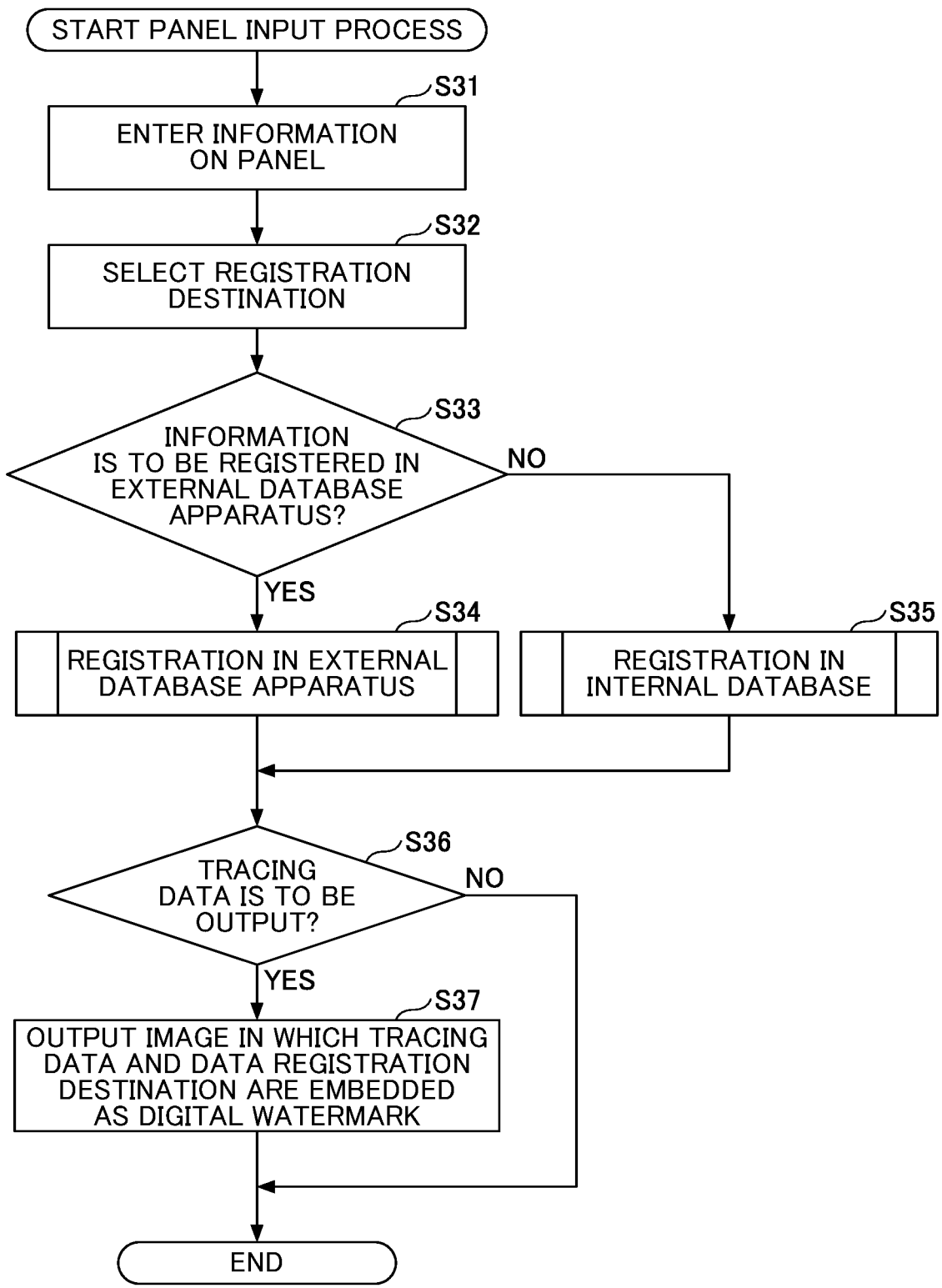
FIG. 19 is a flowchart illustrating steps in a panel input process, according to an embodiment of the present disclosure.

FIG. 19 is a flowchart illustrating steps in the panel input process of step S22 in FIG. 18. The applicant or the person in charge at the authorities enters information relating to an application form on the touch panel 10c. The information input unit 21 receives this input (S31).

The information input unit 21 reads out the registration destination in which the information is to be registered, which destination is set in the information registration setting field 302 on the initial setting screen 301 (S32).

The information input unit 21 determines whether the database apparatus 30, which is external to the image processing apparatus 10, is set as the information registration destination (S33).

In a case where the database apparatus 30, which is external to the image processing apparatus 10, is set as the information registration destination (S33: YES), the information input unit 21 registers the information relating to the application form in the database apparatus 30 set on the initial setting screen 301 (S34). The detailed description of the process at S34 is provided below, with reference to FIG. 20.

In a case where the database apparatus 30, which is external to the image processing apparatus 10, is not set as the information registration destination (S33: NO), the information input unit 21 registers the information relating to the application form internally in the image processing apparatus 10 (S35). The detailed description of registering the information in the image processing apparatus 10 is provided below, with reference to FIG. 21.

Upon completion of the registration, the information input unit 21 determines whether to output tracing data based on the settings configured via the initial setting screen 301 (S36).

In a case where the settings configured via the initial setting screen 301 indicates that tracing data is to be output (S36: YES), the tracing unit 24 generates tracing data and access destination, and the output unit 27 outputs an image in which the tracing data and the access destination are embedded as a digital watermark (S37).

Figure 20:
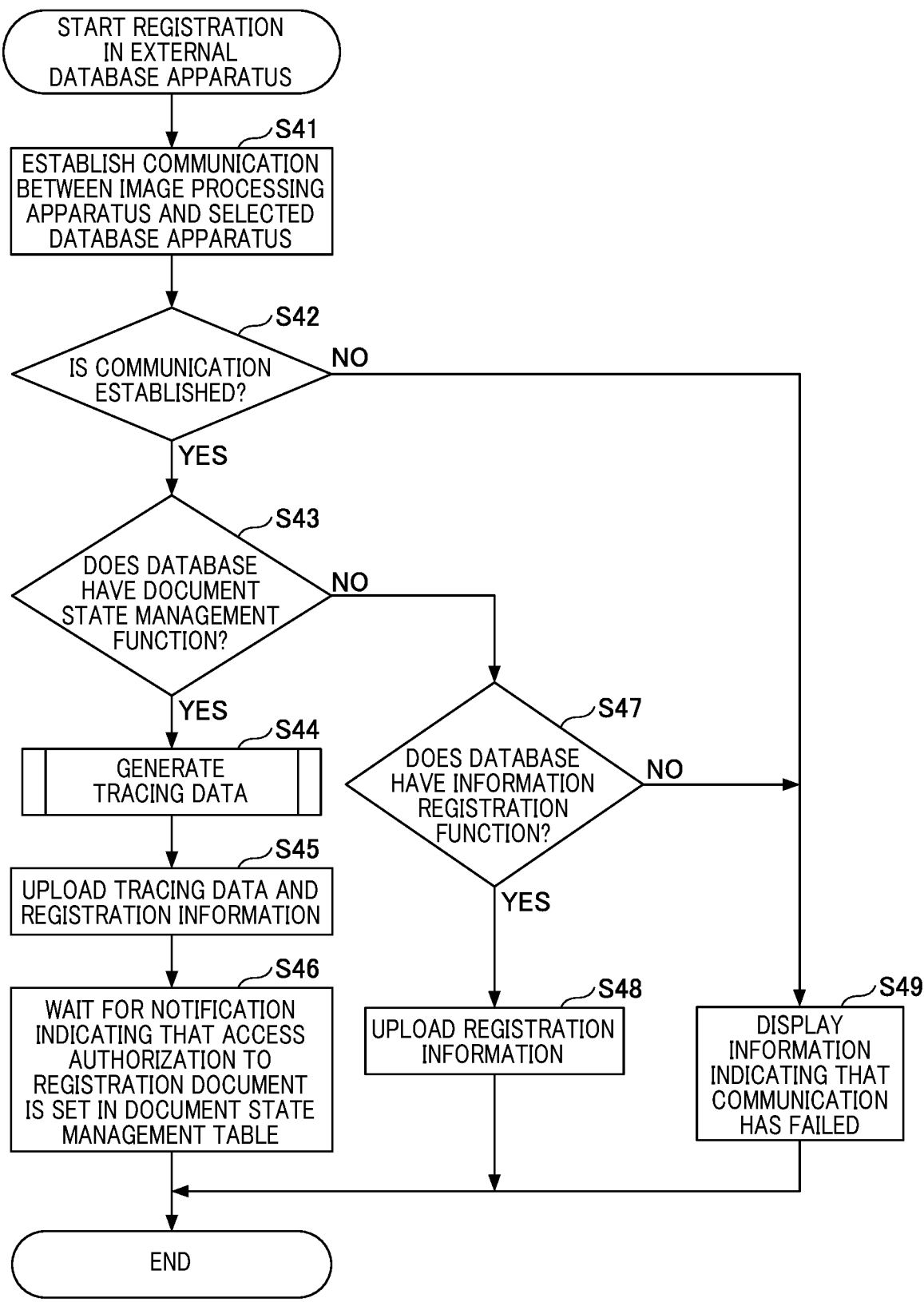
FIG. 20 is a flowchart illustrating an example of an operation, performed by the image processing apparatus, of registering tracing data and image data of an application form in the database apparatus, according to an embodiment of the present disclosure.

FIG. 20 is a flowchart illustrating an example of an operation, performed by the image processing apparatus 10 in step S34 of FIG. 19, of registering tracing data and image data of the application form in the database apparatus 30, which is external to the image processing apparatus 10.

In a case where the settings configured via the initial setting screen 301 indicates that the information relating to an application form is to be registered in the database apparatus 30, which is external to the image processing apparatus 10, the communication unit 19 establishes communication between the image processing apparatus 10 and the database apparatus 30 that is designated as a registration destination in the information registration setting field 302 (S41).

The information input unit 21 determines whether the communication between the image processing apparatus 10 and the database apparatus 30 is successfully established (S42). In a case where the communication is successfully established (S42: YES), the information input unit 21 determines whether the database apparatus 30 has a document state management function (S43). The document state management function is a function of tracing an examination status described in the present embodiment. The reason why the information input unit 21 determines whether the database apparatus 30 has the document state management function is that the database apparatus 30 of a certain type does not have the document state management function.

In a case where the database apparatus 30 has the document state management function (S43: YES), the tracing unit 24 generates tracing data and access destination internally or acquires tracing data and access destination externally (S44). The detailed description of the process of step S44 is provided below, with reference to FIG. 22.

Next, the information input unit 21 sends a request to register a set of the information relating to an application form and the tracing data to the database apparatus 30, which is external to the image processing apparatus 10 (S45). In other words, the information input unit 21 uploads the information relating to an application form and the tracing data to the database apparatus 30. The registration of the access destination is optional.

The information input unit 21 receives, from the database apparatus 30, a notification the indicating that the information relating to the application form, the examination status and the tracing data are registered in the data table T1, the document state management table T2, and the document state management authorization table T3 (S46). Then, the operation ends.

In a case where the establishment of communication between the image processing apparatus 10 and the database apparatus 30 fails (S42: NO), the output unit 27 displays an error notification indicating that communication is unavailable (S49).

In a case where the determination result at step S43 indicates that the database apparatus 30 does not has the document state management function, the information input unit 21 determines whether the database apparatus 30 has a function of information registration (S47). This information registration means registration of the information relating to the application form.

In a case where the determination result at step S47 indicates that the database apparatus 30 has the function of information registration, the information input unit 21 registers the information relating to the application form in the database apparatus 30 (S48). By contrast, in a case where the determination result at step S47 indicates that the database apparatus 30 does not have the function of information registration, the information input unit 21 output a notification indicating communication is unavailable (S49). Then, the operation ends.

Figure 21:
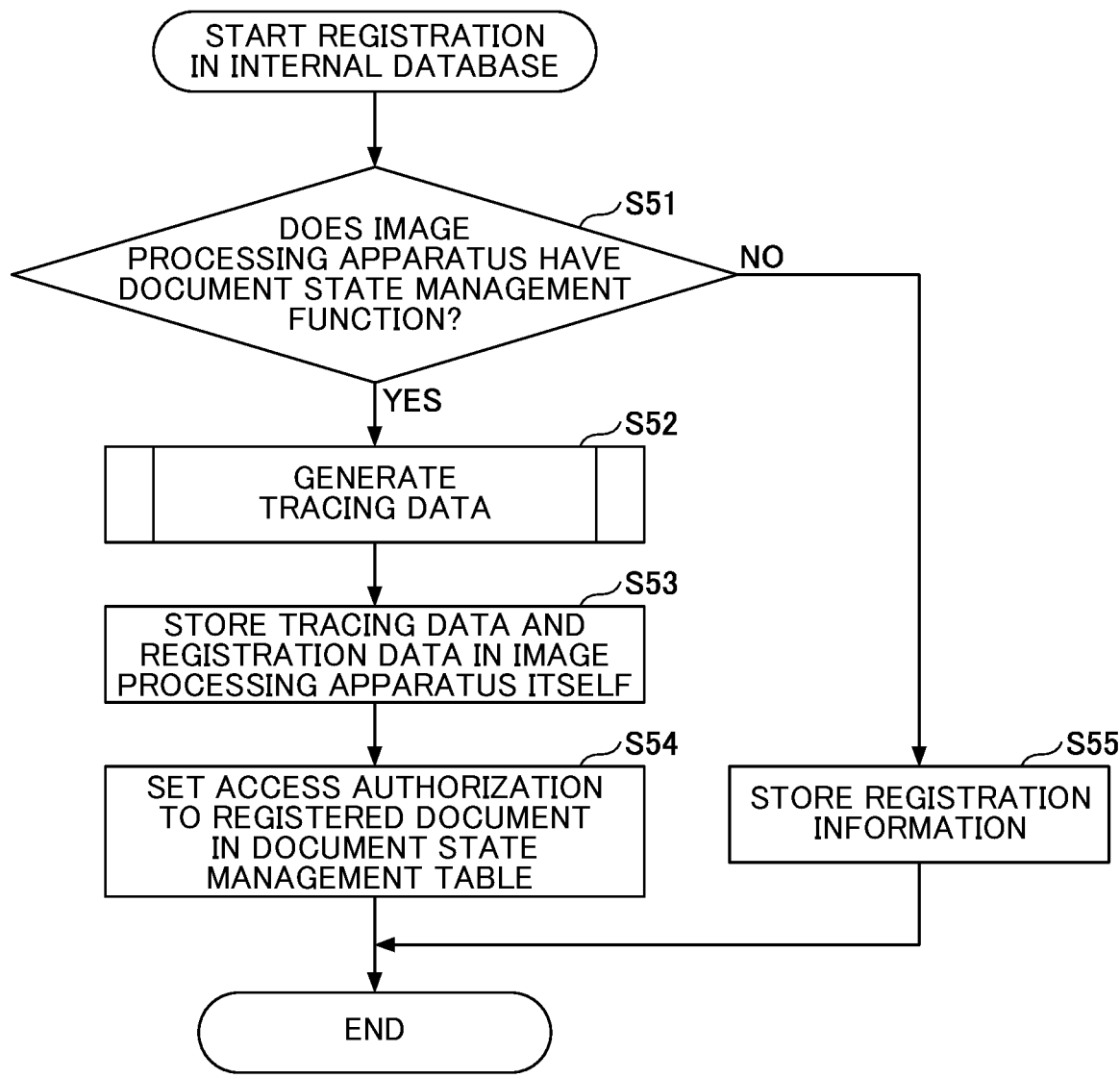
FIG. 21 is a flowchart illustrating an example of an operation, performed by the image processing apparatus, of registering information relating to an application form, a document state, and tracing data internally in the image processing apparatus itself, according to an embodiment of the present disclosure.

FIG. 21 is a flowchart illustrating an example of an operation, performed by the image processing apparatus 10 in step S35 of FIG. 19, of registering information relating to an application form, a document state, and the tracing data internally in the image processing apparatus 10 itself.

The information input unit 21 of the image processing apparatus 10 determines whether a document state management function is valid (S51).

In a case where the document state management function is valid (S51: YES), the tracing unit 24 generates tracing data internally or acquires tracing data externally (S52). At S52, an access destination is also generated or acquired. The detailed description of the process of step S52 is provided below, with reference to FIG. 22.

Next, the information input unit 21 stores the tracing data associated with the information relating to an application form that is input by information input unit 21 or the image input unit 22 internally in the image processing apparatus 10 itself (S53).

Next, the information input unit 21 associates the data table T1 in which the information relating to the application form is registered, the document state management table T2, and the document state management authorization table T3 with each other (S54). Further, at this step, an access authorization to an examination status is set in the document state management authorization table T3.

In a case where the determination result at step S51 indicates that the image processing apparatus 10 does not has the document state management function, the information input unit 21 stores the entered information relating to the application form internally in the image processing apparatus 10 (S55). Then, the operation ends.

Figure 22:
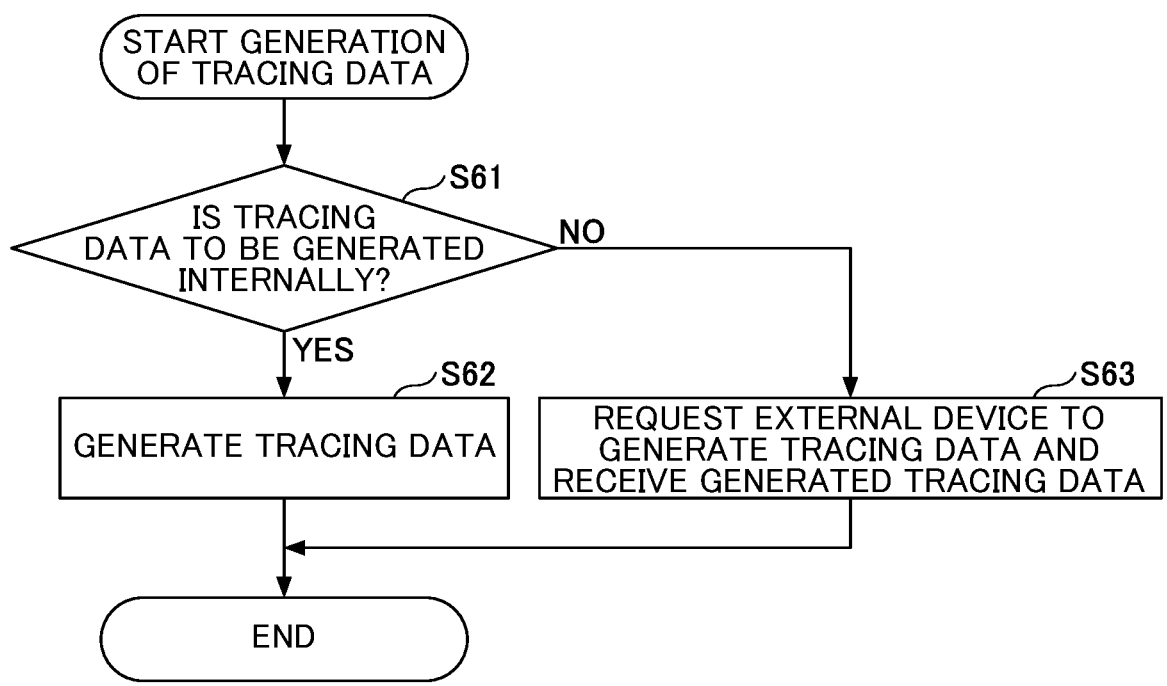
FIG. 22 is a flowchart illustrating an example of an operation of generating tracing data, performed by a tracing unit, according to an embodiment of the present disclosure.

FIG. 22 is a flowchart illustrating an example of an operation of generating tracing data, performed by the tracing unit 24 in step S44 of FIG. 20 or in step S52 of FIG. 21.

First, the tracing unit 24 reads out a setting configured in the tracing data acquisition setting field 304 on the initial setting screen 301 to determine whether the setting indicates whether the tracing data is to be generated internally by the image processing apparatus 10 or to be acquired from the outside (S61).

In a case where the setting indicates that tracing data is to be generated internally by the image processing apparatus 10 (S61: YES), the tracing unit 24 generates tracing data and an access destination (S62).

In a case where the setting indicates that tracing data is to be acquired from the outside, the tracing unit 24 communicates with the database apparatus 30 or the tracing apparatus 50 (S61: NO), each of which is external to the image processing apparatus 10 and generates tracing data, to acquire tracing data and an access destination (S63).

Figure 23:
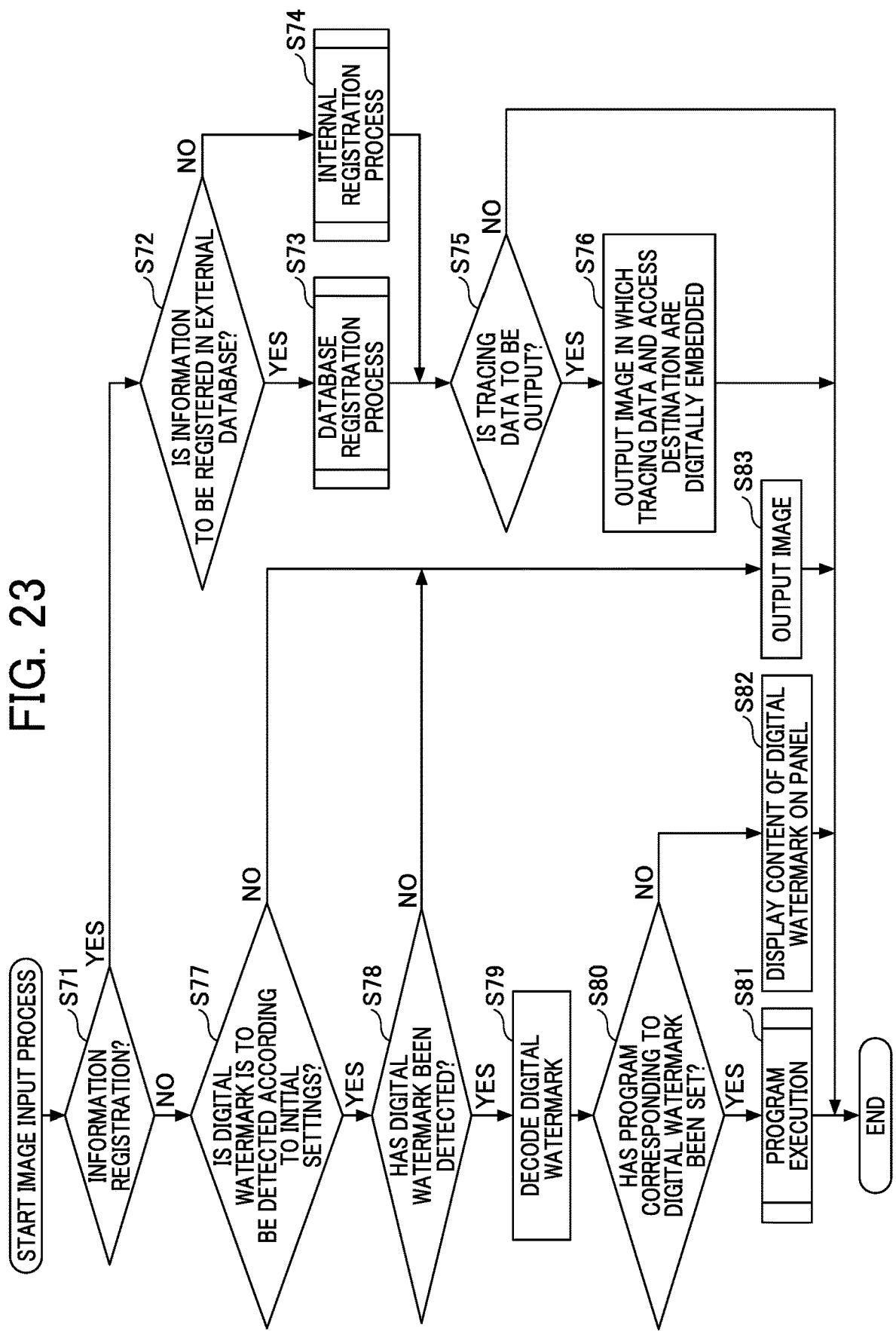
FIG. 23 is a flowchart illustrating steps in an image input process, according to an embodiment of the present disclosure.

FIG. 23 is a flowchart illustrating steps in the image input process of step S23 in FIG. 18. An image is input when the application form copy 9 is read or when an application form is read.

The image input unit 22 determines whether an image is input as part of registration of information relating to an application form (S71). In other words, the image input unit 22 determines whether image data obtained by scanning is to be registered or a digital watermark is to be detected based on an operation content.

In a case where image data of an application form is to be registered (S71: YES), the image input unit 22 determines whether to register the image data externally in the database apparatus 30 based on a setting configured in the information registration setting field 302 on the initial setting screen 301 (S72).

In a case where the setting indicates that the information registration destination is the database apparatus 30 (S72: YES), the image input unit 22 registers the image data externally in the database apparatus 30 (S73). The registration of data in step S73 is performed in the same or substantially the same manner as described above with reference to FIG. 20.

In a case where the setting indicates that the information registration destination is internal (S72: NO), the image input unit 22 registers the image data internally in the image processing apparatus 10 (S74). The registration of data in step S74 is performed in the same or substantially the same manner as described above with reference to FIG. 21.

Next, the image input unit 22 determines whether tracing data is to be generated internally by the image processing apparatus 10 or externally based on a setting configured in the tracing data acquisition setting field 304 on the initial setting screen 301 (S75).

In a case where the setting indicates that tracing data is to be generated internally (S75: YES), the tracing unit 24 generates tracing data and access destination. Further, the digital embedding unit 28 synthesizes the access information and the tracing data into the image data as a digital watermark, and the output unit 27 outputs the image data in which the digital watermark is embedded (S76).

By contrast, in a case where the image input unit 22 determines that an input operation is not the registration of image data (S71: NO), the information input unit 21 determines whether a digital watermark is to be detected based on a setting configured in the digital watermark setting field 305 on the initial setting screen 301 (S77).

In a case where the setting indicates that no digital watermark is to be detected (S77: NO), the output unit 27 outputs the input image data as is (S83).

In a case where the setting indicates that a digital watermark is to be detected (S77: YES), the digitally embedded information detector 23 determines whether a digital watermark is detected (S78).

In a case where no digital watermark is detected (S78: NO), the output unit 27 outputs the input image data as is (S83).

When a digital watermark is detected (S78: YES), the digitally embedded information detector 23 decodes the digital watermark to acquire the information (S79).

Next, the image input unit 22 determines whether a program that is to be executed in response to detection of a digital watermark is set in the digital watermark setting field 305 (S80).

When a program that is to be executed in response to detection of a digital watermark is set (S80: YES), the set program is executed so that a processing corresponding to the program is performed (S81). The detailed description of the process of step S81 is provided below, with reference to FIG. 24.

In a case where a program that is to be executed in response to detection of digital watermark is not set (S80: NO), the output unit 27 displays the information of the digital watermark on the touch panel 10c (S82).

Figure 24:
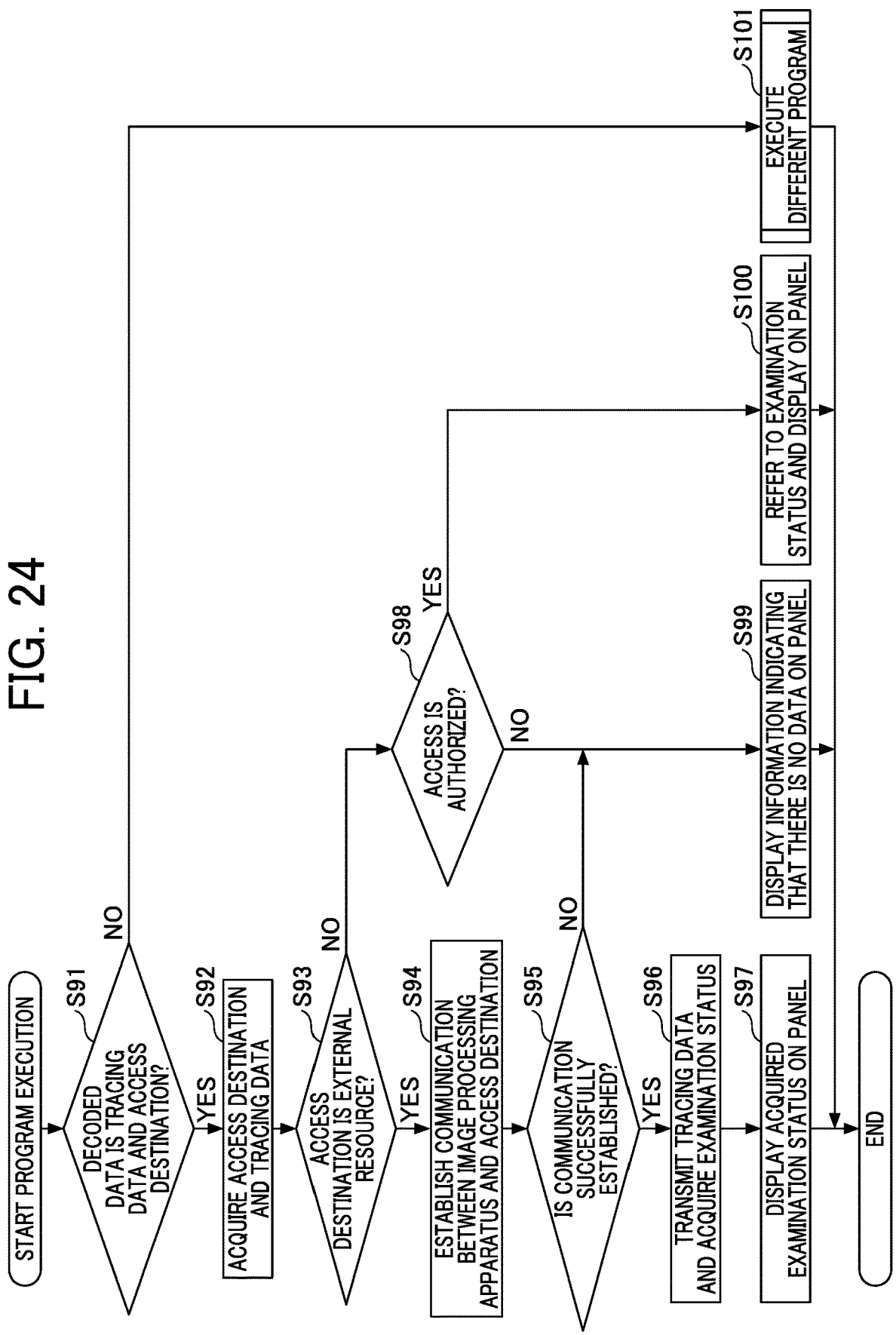
FIG. 24 is a flowchart illustrating an example of an operation performed according to a program that is executed in response to detection of a digital watermark, according to an embodiment of the present disclosure.

FIG. 24 is a flowchart illustrating an example of an operation performed according to the program that is executed in response to detection of a digital watermark, performed at S81 of FIG. 23. With reference to FIG. 24, a description is given of an example case where a program for acquiring an examination status of an application form is activated.

The examination status acquisition unit 26 of the image processing apparatus 10 determines whether the information obtained by decrypting the digital watermark is tracing data and an access destination (S91).

In a case where the information is not tracing data and an access destination (S91: NO), a different program is executed (S101). The different program corresponds to the information obtained by decoding the digital watermark, and in the present embodiment, a description thereof is omitted in order to simplify the description.

In a case where the information obtained by decoding the digital watermark is tracing data and an access destination (S91: YES), the examination status acquisition unit 26 acquires the tracing data and the access destination from the digital watermark (S92).

Based on the acquired access destination, the examination status acquisition unit 26 determines whether the access destination is the database apparatus 30 or the tracing apparatus 50, which are external to the image processing apparatus 10 (S93).

In a case where the access destination is the database apparatus 30, the examination status acquisition unit 26 establishes communication between the image processing apparatus 10 and the database apparatus 30 (S94). The examination status acquisition unit 26 determines whether the communication between the image processing apparatus 10 and the database apparatus 30 is successfully established (S95).

When the communication is successfully established (S95: YES), the examination status acquisition unit 26 transmits the tracing data to the database apparatus 30, which is external to the image processing apparatus 10, and acquires an examination status of the application form corresponding to the tracing data (S96).

Next, the output unit 27 displays the acquired examination status on the touch panel 10c (S97).

In a case where the access destination is not the database apparatus 30 (S93: NO), the examination status acquisition unit 26 searches the document state management authorization table T3 in the image processing apparatus 10 itself for the tracing data to determine whether an access authorization associated with the tracing data of the digital watermark permits an access (S98).

In a case where the search result indicates that the tracing data is not present or the access authorization is not present (S98: NO), the output unit 27 displays, on the touch panel 10c, a notification indicating that there is no data (S99).

In a case where the search result indicates that the tracing data is present and the access authorization is present (S98: YES), the output unit 27 displays, on the touch panel 10c, the acquired examination status (S100).

<Operation by Database Apparatus 30>

Figure 25:
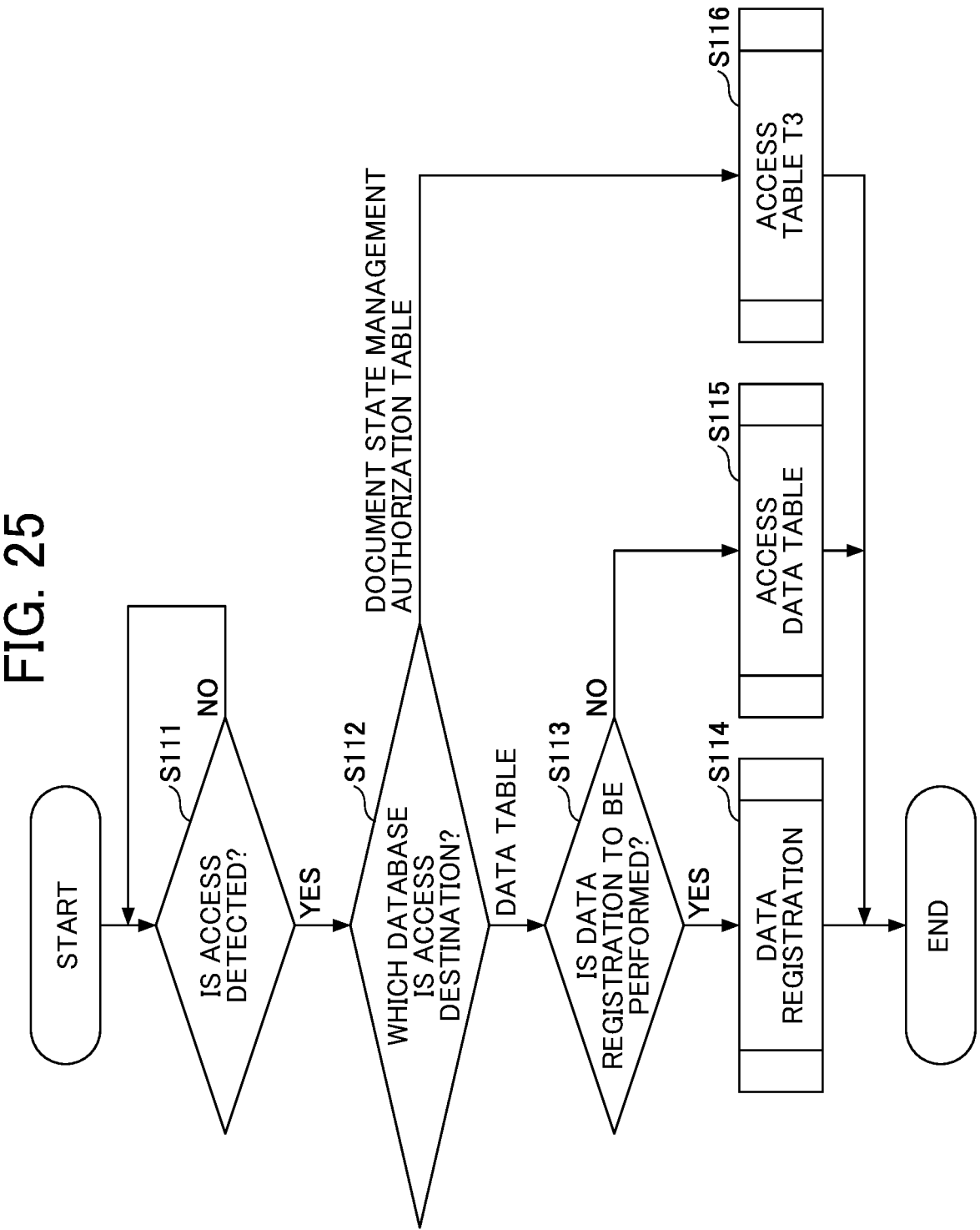
FIG. 25 is a flowchart illustrating an example of an operation performed by the database apparatus, according to an embodiment of the present disclosure.

FIG. 25 is a flowchart illustrating an example of an operation performed by the database apparatus 30. Similar to when image data is registered in the image processing apparatus 10, the external access detector 41 of the database apparatus 30 waits until it detects whether an access to the information relating to an application form occurs (S111). In addition, the database apparatus 30 performs notification of communication availability/unavailability and notification of presence/absence of management function of the database apparatus 30 itself.

When an access to the information is detected (S111: YES), the external access detector 41 determines an access destination (S112). This access destination is a type of database (table). Specifically, the external access detector 41 determines whether the access destination is the document state management authorization table T3.

In a case where the access destination is other than the document state management authorization table T3, the external access detector 41 determines whether a registration of the information relating to an application form is requested or an update of the document state management table T2 is requested (S113).

In a case where the registration of the information relating to an application form is requested (S113: YES), the database editing unit 43 performs a data registration process (S114). The detailed description of the process of step S114 is provided below, with reference to FIG. 26.

In a case where the update of the document state management table T2 is requested (S113: NO), the database editing unit 43 performs a process of handling an access to the document state management table T2 for update (S115). The detailed description of the process at S115 is provided below, with reference to FIG. 27.

In a case where the external access detector 41 determines, in step S112, that the access destination is the document state management authorization table T3, the database editing unit 43 performs a process of handling an access to the document state management authorization table T3 (S116). The detailed description of the process at S116 is provided below, with reference to FIG. 28.

Figure 26:
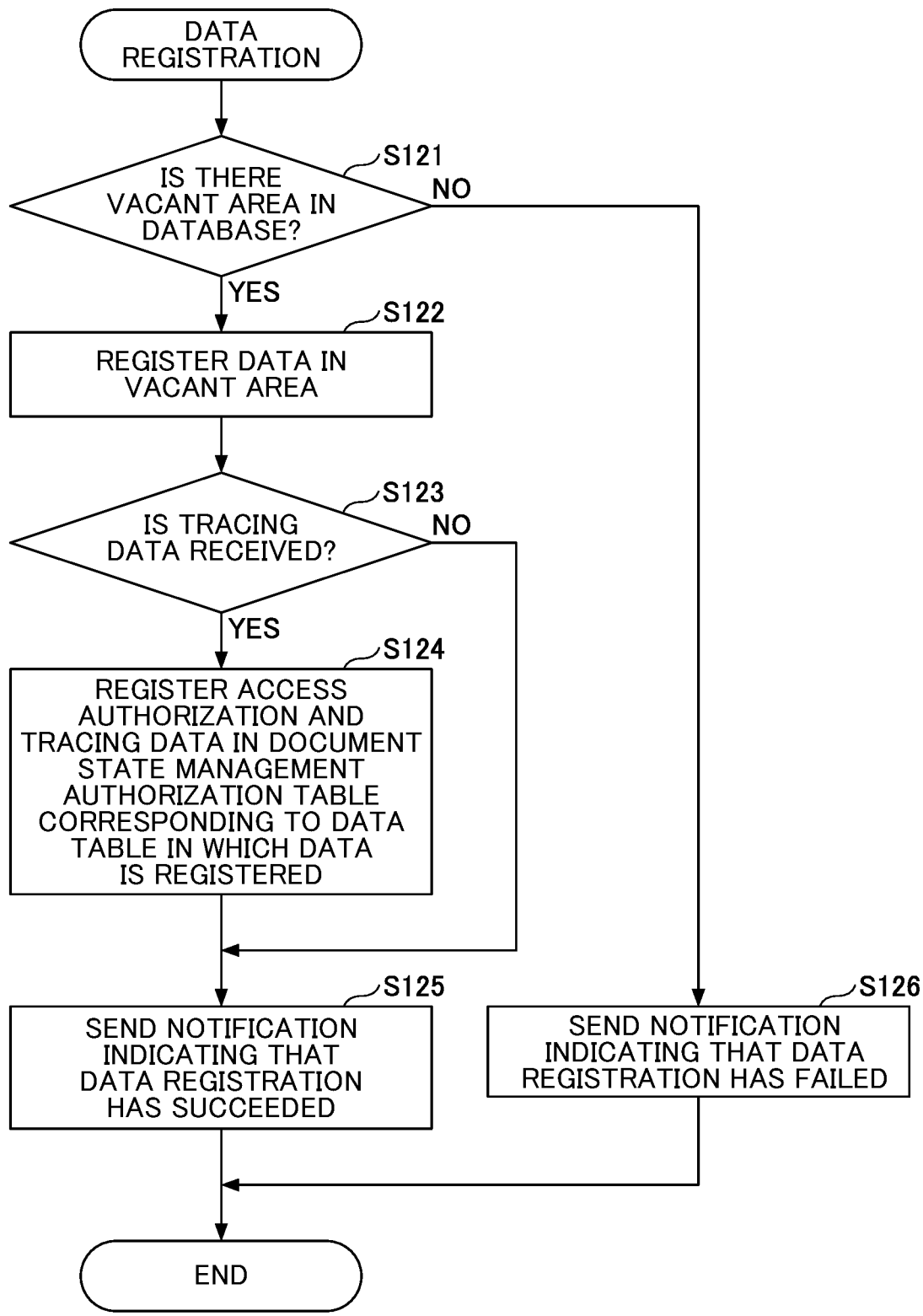
FIG. 26 is a flowchart illustrating an example of an operation of registering information relating to an application form, performed by the database apparatus, according to an embodiment of the present disclosure.

FIG. 26 is a flowchart illustrating an example of operation of registering the information relating to an application form, performed by the database apparatus 30 in step S114 of FIG. 25.

First, the database editing unit 43 determines whether in the data table T1, there is a vacant area (S121).

In a case where there is no vacant area (S121: NO), the database editing unit 43 sends, to the image processing apparatus 10, a notification indicating that the information cannot be registered (S126).

In a case where there is a vacant area (S121: YES), the database editing unit 43 registers the information relating to an application form in the vacant area (S122).

Next, the database editing unit 43 determines whether tracing data is to be registered (S123). In a case where tracing data is transmitted from the image processing apparatus 10 together with the information relating to an application form, the database editing unit 43 determines that the tracing data is to be registered.

In a case where the tracing data is transmitted from the image processing apparatus 10 (S123: YES), the database editing unit 43 registers the tracing data in the document state management authorization table T3 corresponding to the data table T1 in which the information relating to application form is registered, and assigns access authorization in association with the tracing data (S124). Further, the database editing unit 43 sets an examination status in the document state management table T2 to an initial state.

Next, the database editing unit 43 sends, to the image processing apparatus 10, a notification indicating that the information is successfully registered (S125). Also in a case where no tracing data is transmitted from the image processing apparatus 10 (S123: NO), the database editing unit 43, sends a notification indicating that the information is successfully registered (S125), without registering the tracing data and the access authorization in the document state management authorization table T3.

Figure 27:
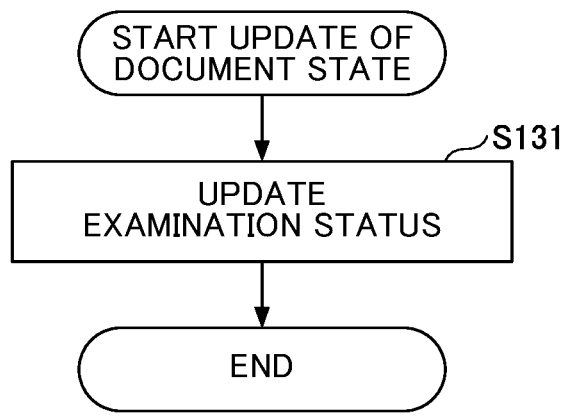
FIG. 27 is a flowchart illustrating an example of an operation of handling an access to a document state management table for updating an examination status, performed by the database apparatus, according to an embodiment of the present disclosure.

FIG. 27 is a flowchart illustrating an example of an operation of handling an access to the document state management table T2 for updating an examination status, performed by the database apparatus 30 in step S115 of FIG. 25.

The registered information relating to an application form is managed in the data table T1, and an examination status is managed in the document state management table T2 in association with the data table T1.

When an examination status of the registered application form is updated, the database editing unit 43 updates the examination status of the application form specified by a document ID or the like (S131).

Figure 28:
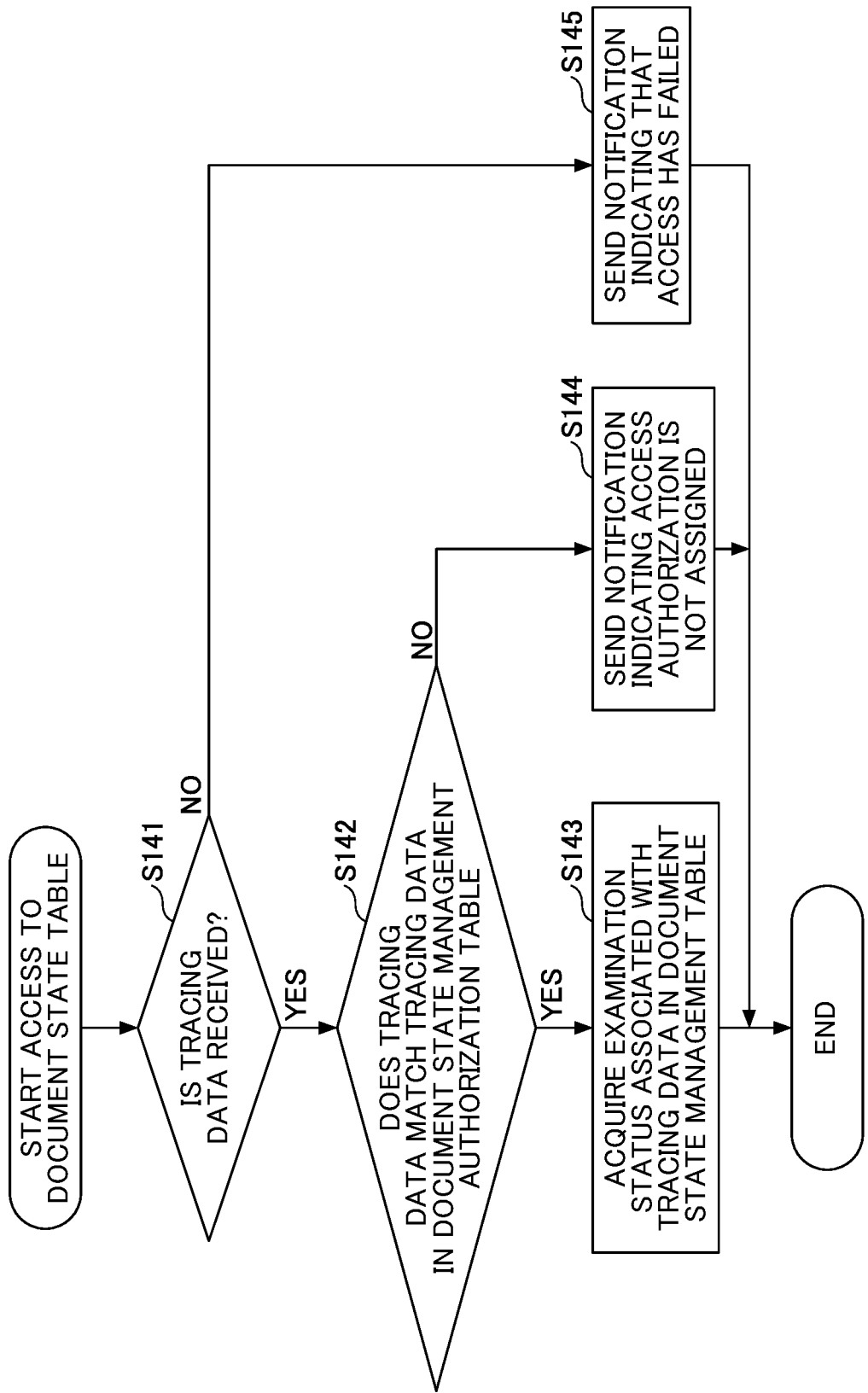
FIG. 28 is a flowchart illustrating an example of an operation of handling an access to a document state management authorization table, performed by the database apparatus, according to an embodiment of the present disclosure.

FIG. 28 is a flowchart illustrating an example of an operation of handling an access to the document state management authorization table T3, performed by the database apparatus 30 in step S116 of FIG. 25. The access to the document state management authorization table T3 means that an inquiry about an examination status is made.

First, when an access to the document state management table T2 occurs, the database editing unit 43 determines whether tracing data is received or whether the tracing data is generated (S141).

In a case where no tracing data is received or in a case where no tracing data is generated (S141: NO), the database editing unit 43 sends, to the image processing apparatus 10, a notification indicating that an access to the document state management table T2 is unavailable (S145).

In a case where tracing data is received or in a case where tracing data is generated (S141: YES), the tracing unit 37 determines whether the tracing data is registered in the document state management authorization table T3 (S142).

In a case where the tracing data is registered (S142: YES), the tracing unit 37 acquires an examination status of an application form as a target from the document state management table T2 and sends the acquired examination status to the image processing apparatus 10, which is a request source (S143).

When the tracing data is not registered (S142: NO), the tracing unit 24 determines that there is no access authorization and sends an error notification indicating that no access authorization is assigned (S144).

<Example of Application Form>

FIG. 29 is an illustration of an example of a registration screen 331 of image data when an application form of a solar power construction is filed. The registration screen 331 includes an application form field 332, an upload destination display field 333, a document state access sheet output field 334, and an input button 335.

An applicant enters information using the touch panel 10c according to a data format for application displayed on the registration screen 331, and configures settings in the application form field 332, the upload destination display field 333, and the document state access sheet output field 334. The operation unit 11 receives an operation by the applicant. In the document state access sheet output field 334, a setting is configured as to whether to output the application form copy 9 containing a digital watermark.

Thus, the applicant can get the application form copy 9 printed out after uploading an application form, and obtain information on the examination status using the application form copy 9.

FIG. 30 is an illustration of another example of the registration screen 331. The registration screen 331 of FIG. 30 includes a scan start button 336 in place of the application form field 332 in FIG. 29. By pressing the scan start button 336, the applicant can instruct the image processing apparatus 10 to scan a paper medium on which information relating to an application form is described, thereby inputting the application form.

FIG. 31 is an illustration of an example of an examination status screen 341 displayed on the touch panel 10c when the examination status is traced by causing the image processing apparatus 10 to read the application form copy 9. When the application form copy 9 on which a digital watermark is formed is input to the image processing apparatus 10 and the image processing apparatus 10 acquires tracing data and an access destination indicated by the digital watermark, the output unit 27 displays an examination status 342. In the example of FIG. 31, a message "Under Review" is displayed indicating that the application form is under review.

Figure 32:
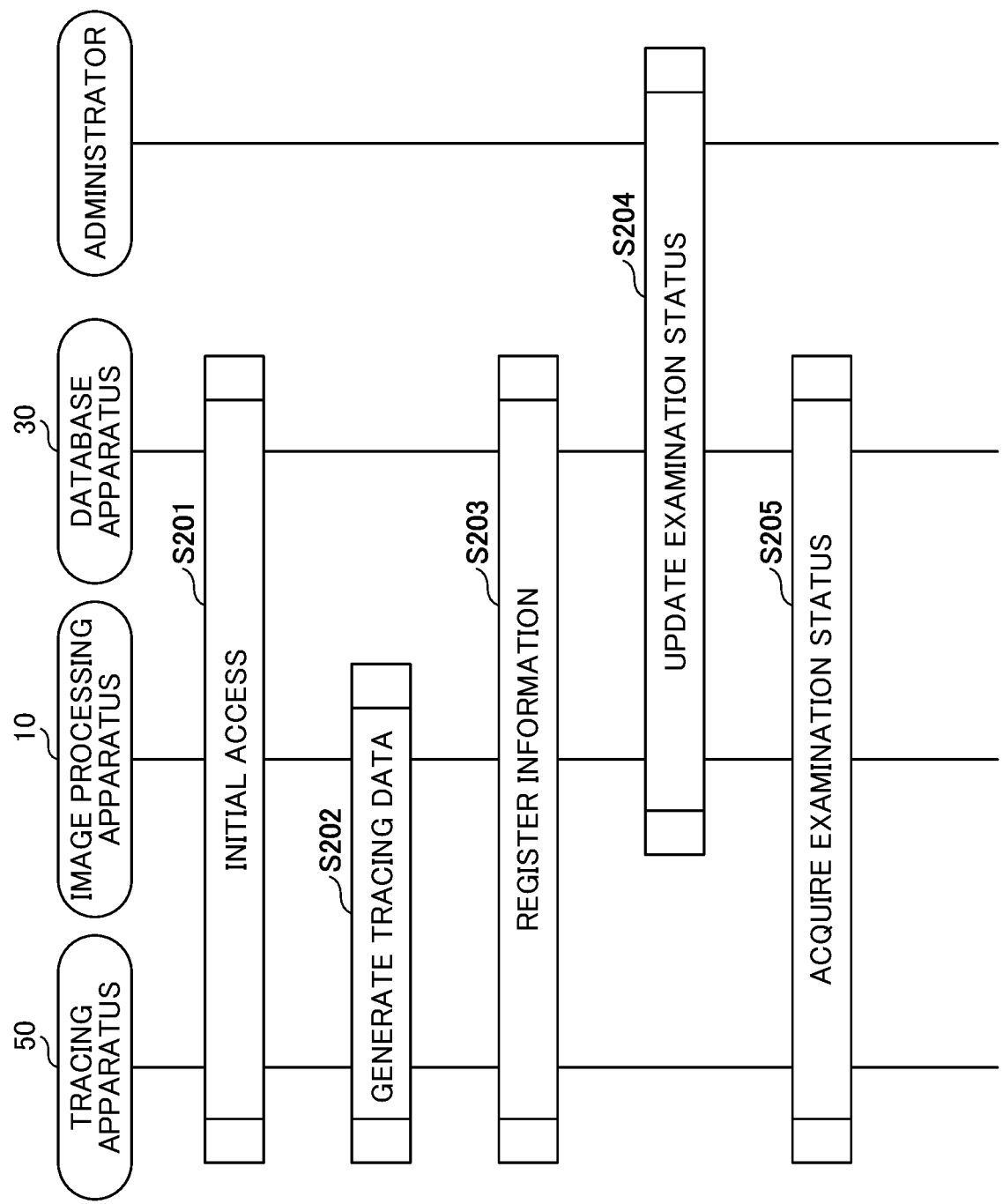
FIG. 32 is a sequence diagram illustrating an example of an entire operation performed by the document state management system, according to an embodiment of the present disclosure.

Sequence Diagrams:

FIG. 32 is a sequence diagram illustrating an example of an entire operation performed by the document state management system 100, according to the present embodiment. An initial access in step S201 is a process in which the image processing apparatus 10, the database apparatus 30, and the tracing apparatus 50 initially communicate with each other. The detailed description of the process of step S201 is provided below, with reference to FIG. 33.

Generating tracing data in step S202 is a process of generating tracing data performed by the image processing apparatus 10 and the tracing apparatus 50. The detailed description of the process of step S201 is provided below, with reference to FIG. 34.

Registering information in step S203 is a process of registering information relating to an application form performed between the image processing apparatus 10 and the database apparatus 30.

Updating an examination status in step S204 is a process of updating a document state in accordance with an operation by a person in charge at the authorities or the like who has the authority to update, and a process concerning how the examination status is updated. The detailed description of the process of step S204 is provided below, with reference to FIG. 35.

Acquiring an examination status in step S205 is a process in which the image processing apparatus 10 extracts tracing data and access information from a digital watermark and acquires an examination status from the database apparatus 30.

Figure 33:
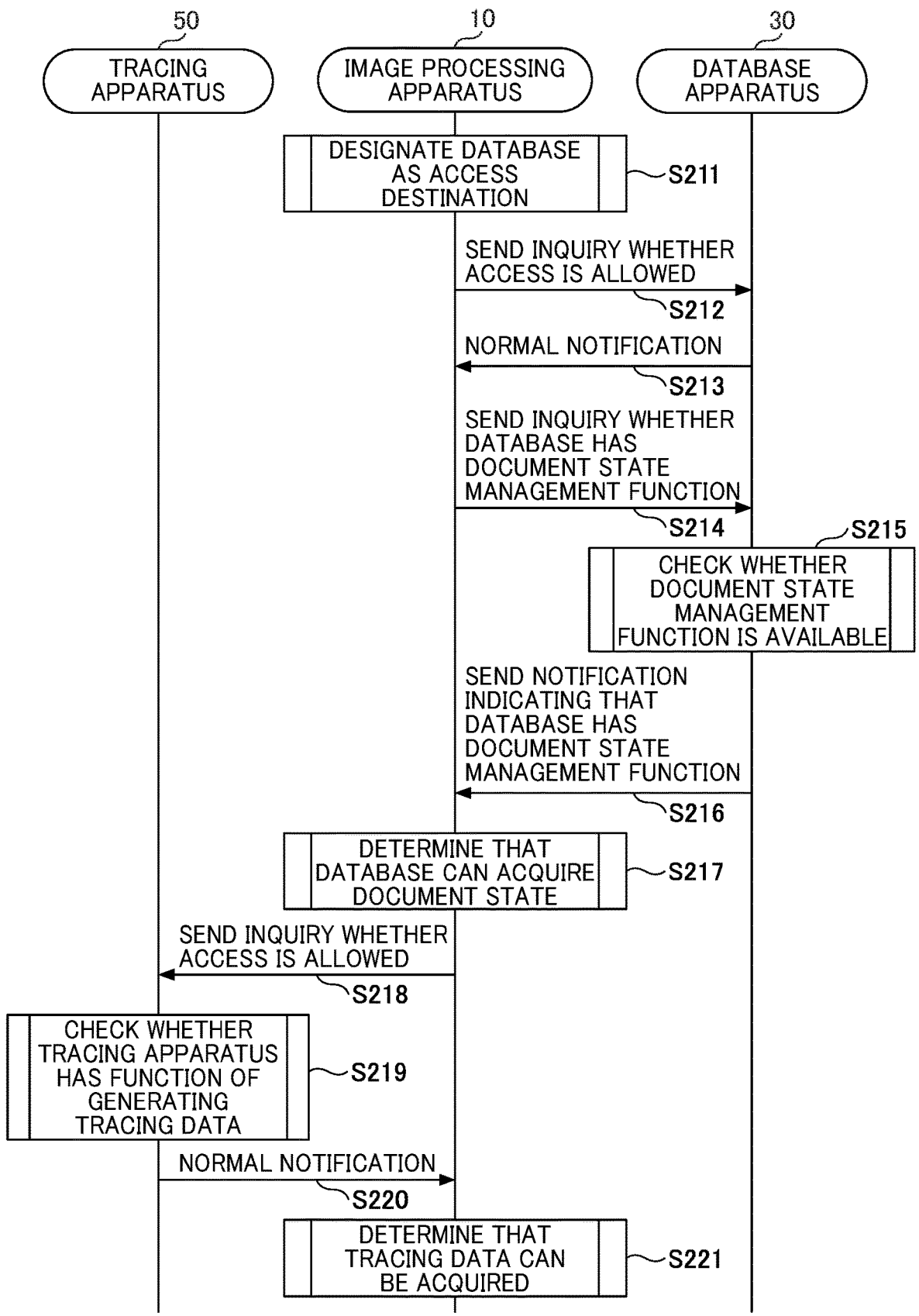
FIG. 33 is a sequence diagram illustrating an example of steps in an initial access, according to an embodiment of the present disclosure.

FIG. 33 is a sequence diagram illustrating an example of steps in the initial access. S211: The image processing apparatus 10 designates the database apparatus 30 as an access destination.

S212, S213: In response to the designation, the communication unit 19 checks whether the image processing apparatus 10 can access the database apparatus 30.

S214 to S216: In a case where the image processing apparatus 10 can normally accesses the database apparatus 30, the communication unit 19 sends an inquiry to the database apparatus 30 to check the availability of a document state management function. The database apparatus 30 checks the availability of the document state management function and sends, to the image processing apparatus 10, a notification indicating whether the document state management function is available.

S217: In a case where the notification indicates that the document state management function is available, the image processing apparatus 10 determines that the database apparatus 30 can acquire a document state.

S218: The communication unit 19 of the image processing apparatus 10 inquires of the tracing apparatus 50 whether the tracing apparatus 50 can generate tracing data.

S219: The tracing apparatus 50 determines whether the tracing apparatus 50 itself has a function of generating tracing data.

S220: The tracing apparatus 50 sends, to the image processing apparatus 10, a reply (normal notification) indicating that the tracing apparatus 50 can generate tracing data.

S221: The image processing apparatus 10 determines that tracing data can be acquired.

Figure 34:
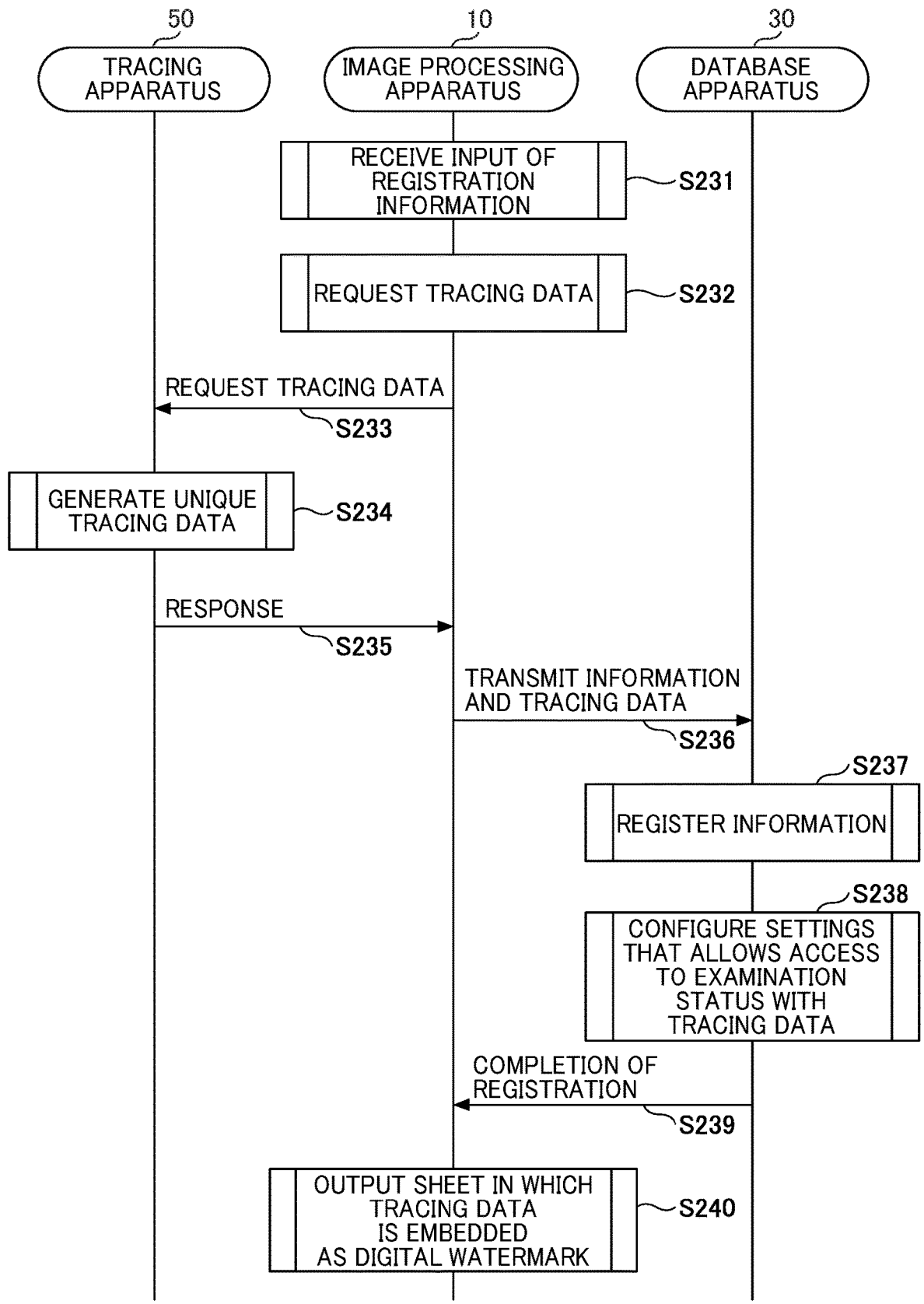
FIG. 34 is a sequence diagram illustrating an example of steps in an operation relating to generation of tracing data, according to an embodiment of the present disclosure.

FIG. 34 is a sequence diagram illustrating an example of steps in an operation relating to generation of tracing data.

S231: The information input unit 21 of the image processing apparatus 10 receives an input of the information relating to an application form.

S232, S233: The tracing unit 24 generates tracing data. Alternatively, in a case where the setting configured via the initial setting screen 301 indicates that tracing data is to be generated by an external apparatus, the tracing unit 24 requests the outside to transmit tracing data.

S234, S235: The tracing apparatus 50 generates unique tracing data and transmits the generated tracing data to the image processing apparatus 10.

S236: The image processing apparatus 10 transmits, to the database apparatus 30, the information relating to an application form and the tracing data.

S237 to S239: The database apparatus 30 registers the information relating to an application form and the tracing data. Further, the database editing unit 43 performs a setting so that the image processing apparatus 10 can access an examination status of the registered application form using the tracing data, and completes the information registration. Then, the database editing unit 43 sends, to the image processing apparatus 10, a notification indicating that a document state can be acquired.

S240: The output unit 27 of the image processing apparatus 10 outputs a paper medium in which tracing data and access information are form as a digital watermark.

Figure 35:
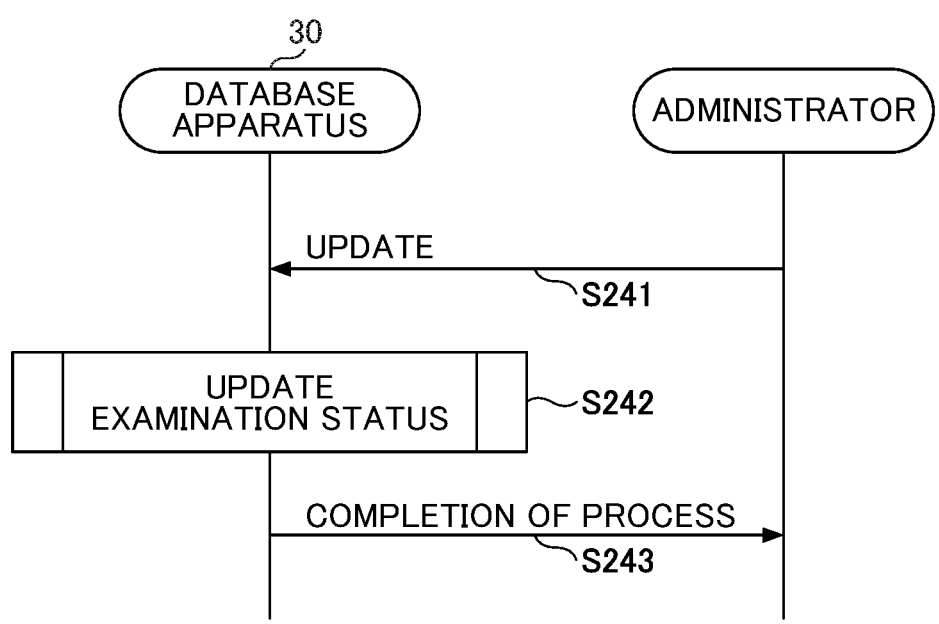
FIG. 35 is a sequence diagram illustrating an example of steps in the process of updating the document state, according to an embodiment of the present disclosure.

FIG. 35 is a sequence diagram illustrating an example of steps in the process of updating the document state.

S241: A person in charge at the authorities or the like designates an application form for which an examination has progressed, and updates an examination status registered in the database apparatus 30.

S242: The database editing unit 43 of the database apparatus 30 updates the registered examination status of image data. For example, when the application form is placed under review, the person in charge at the authorities or the like updates the examination status to "Under review".

S243: The database apparatus 30 causes the output unit 27 of the image processing apparatus 10 to display a notification indicating that the update is completed on the touch panel 10c.

FIG. 36 is a sequence diagram illustrating an example of steps in the process of acquiring the examination status.

S251: The image processing apparatus 10 receives an input of image data having a digital watermark. The digitally embedded information detector 23 detects the digital watermark.

S252: The digitally embedded information detector 23 acquires tracing data from the digital watermark.

S253: The tracing unit 24 transmits the tracing data to the tracing apparatus 50.

S254: The tracing unit 55 of the tracing apparatus 50 searches the tracing table T4 using the tracing data to acquire an access destination associated with the tracing data from the tracing table T4. This step can be omitted when the access destination is printed as a digital watermark on the application form copy 9. In other words, the printing of the access destination on the application form copy 9 is optional.

S255: The tracing apparatus 50 transmits the tracing data to the database apparatus 30 based on the access destination.

S256: The tracing unit 37 of the database apparatus 30 searches the document state management authorization table T3 using the tracing data, and acquires an examination status from the document state management table T2 by specifying a document ID.

S257: The database apparatus 30 transmits the examination status to the tracing apparatus 50.

S258: The tracing apparatus 50 transmits the examination status to the image processing apparatus 10.

S259: The output unit 27 of the image processing apparatus 10 outputs the examination status to the touch panel 10c.

<Database Structure>

Hereinafter, a description is given of the databases (tables) used in the present embodiment, with reference to FIG. 37 and FIG. 38. Table A in FIG. 37 is an example of the data table T1 for registration information. Table B in FIG. 37 is an example of the document state management table T2. Table C in FIG. 37 is an example of the document state management authorization table T3.

The data table T1 has items of "Receipt Number" "Name", "Address", "TEL," "Email", and "Construction Date". In the data table T1, information relating to an application form to be registered at the time of application is registered. The document state management table T2 has items of "Receipt Number", "Document ID", and "Examination Status". In the document state management table T2, an examination status of an application form is registered. The receipt number is identification information that is assigned when the management of the document state is started. The document ID is identification information of a document, which can be assigned in advance or may be assigned by the storage device 901 for registration of an application document. The examination status indicates a degree of progress of examination on an application. The document state management authorization table T3 has items of "Document ID", "Access Authorization", "Tracing data", and "User". In the document state management authorization table T3, tracing data for tracing a document and an access authorization are set. In the document state management authorization table T3, authorization relating to a document is managed. In the access authorization, information indicating what kind of access to a document is permitted is registered. For example, in the access authorization, "none", "reference", "download", "full control (access of all kinds is permitted)" or the like are registered. The tracing data is as described above. The user indicates a person who creates a document or own a document. In response to registration of the tracing data, at least "reference" and "download" are registered as access authorization. Alternatively, only "reference" can be registered. The "reference" indicates that the applicant 7 can obtain the examination status. The "download" indicates that the applicant 7 can download an application form.

Thus, the applicant 7 can obtain information about the examination status of the application form using the tracing data. Further, in a case where, after the registration of the tracing data, an inadequacy or the like of the application form is discovered or a viewing period has elapsed, the administrator can set the access authorization to "none". Accordingly, there can be a case where the access authorization is not assigned, even when the tracing data is registered. By contrast, there can be a case where the tracing data is not registered, even when the access authorization is assigned.

The data table T1 and the document state management table T2 are associated with each other by the receipt number. The document state management table T2 and the document state management authorization table T3 are associated with each other by the document ID.

The tracing unit 24, the tracing unit 37 or the tracing unit 55 refers to the document state management authorization table T3 to determine the presence or absence of the access authorization to the application form, based on the tracing data that is set at the time of information registration. When the determination result indicates that the access authorization is present, the examination status in the document state management table T2 is acquired using the document ID. The access authorization is also set when the tracing data is registered.

Table D in FIG. 37 is an example of the tracing table T4. The tracing table T4 has items of "Document ID", "Tracing Data", and "Access Destination". The tracing table T4 is a table storing tracing data and an access destination in association with each other. The access destination is communication destination information such as a URL indicating a location where the data table T1, the document state management table T2 and the document state management authorization table T3 are stored. In another example, URLs indicating different storage locations are prepared respectively for the data table T1, the document state management table T2, and the document state management authorization table T3.

The tracing apparatus 50 or the like can generate unique tracing data and an access destination using the tracing table T4. Further, in a case where only the tracing data is formed as a digital watermark, the document state management table T2 and the document state management authorization table T3 can be accessed based on the access destination.

The data tables stored in the image processing apparatus 10 and the data tables stored in the database apparatus 30 have the same data structures.

Table A in FIG. 38 is an example of the data table T1. Table B in FIG. 38 is an example of an access log table T5. Table C in FIG. 38 is an example of an access log management authorization table T6. The access log table T5 has items of "Receipt Number", "Document ID", "Number of Printing", "Number of Edits", and "Number of Copying". The access log table T5 is a table for managing what kind of access is made to an application form.

The access log management authorization table T6 has items of "Document ID", "Access Authorization", "Tracing Code", and "User". The access log management authorization table T6 is a table for managing authorization for an access to the access log table T5, and it is the same as the document state management authorization table T3.

The data table T1 and the access log table T5 are associated with each other by the receipt number. The access log table T5 and the access log management authorization table T6 are associated with each other by the document ID.

The tracing unit 24, the tracing unit 37 or the tracing unit 55 refers to the access log management authorization table T6 to determine the presence or absence of the access authorization to the access log table T5, based on the tracing data that is set at the time of information registration. When the determination result indicates that the access authorization is present, the number of printing, the number of edits, and the number of copying in the access log table T5 are acquired using the document ID. The number of printing, the number of edits, and the number of copying may be collectively referred to as an "access log".

Figure 39:
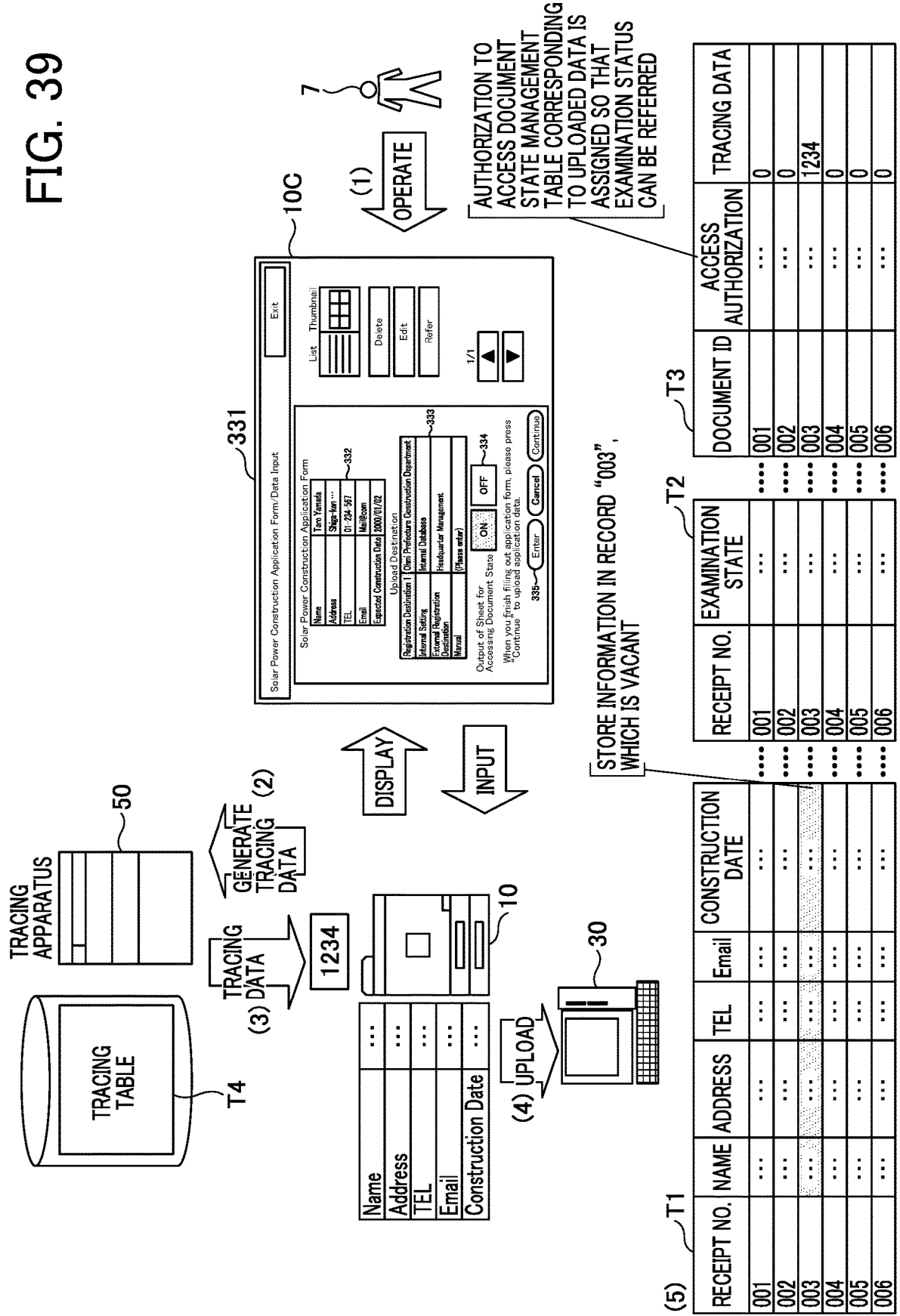
FIG. 39 is an illustration for describing a flow of operation of registering information, according to an embodiment of the present disclosure.

Flow of Operation:

Hereinafter, a description is given of a flow of operation, with reference to FIG. 39 and FIG. 40. FIG. 39 is an illustration for describing a flow of operation of registering information, according to the present embodiment. FIG. 39 illustrates an example case in which image data is input to the image processing apparatus 10, the tracing data is acquired from the tracing apparatus 50, and an information registration destination is the database apparatus 30.

(1) The applicant operates the image processing apparatus 10 to enter information relating to an application form and set a registration destination.

(2) The image processing apparatus 10 sends a request for tracing data to the tracing apparatus 50 so that unique tracing data is generated.

(3) The tracing apparatus 50 holds a tracing table T4 that stores tracing data generated so far in association with access authorization. The tracing apparatus 50 generates new tracing data that does not overlap with the tracing data issued so far, and sends the generated tracing data to the image processing apparatus 10.

(4) The image processing apparatus 10 transmits, to the database apparatus 30, the entered information relating to the application form and the tracing data received from the tracing apparatus 50.

(5) The database apparatus 30 searches for a vacant area for storage in the data table T1 and stores the information relating to the application form in the vacant area. The data table T1 is linked to the document state management table T2, in which the examination status is set. Further, the document state management table T2 is associated with the document state management authorization table T3 that manages access authorization for accessing the document state management table T2. By the registration of the tracing data, access authorization for accessing the document state management table T2 is set in the document state management authorization table T3.

Figure 40:
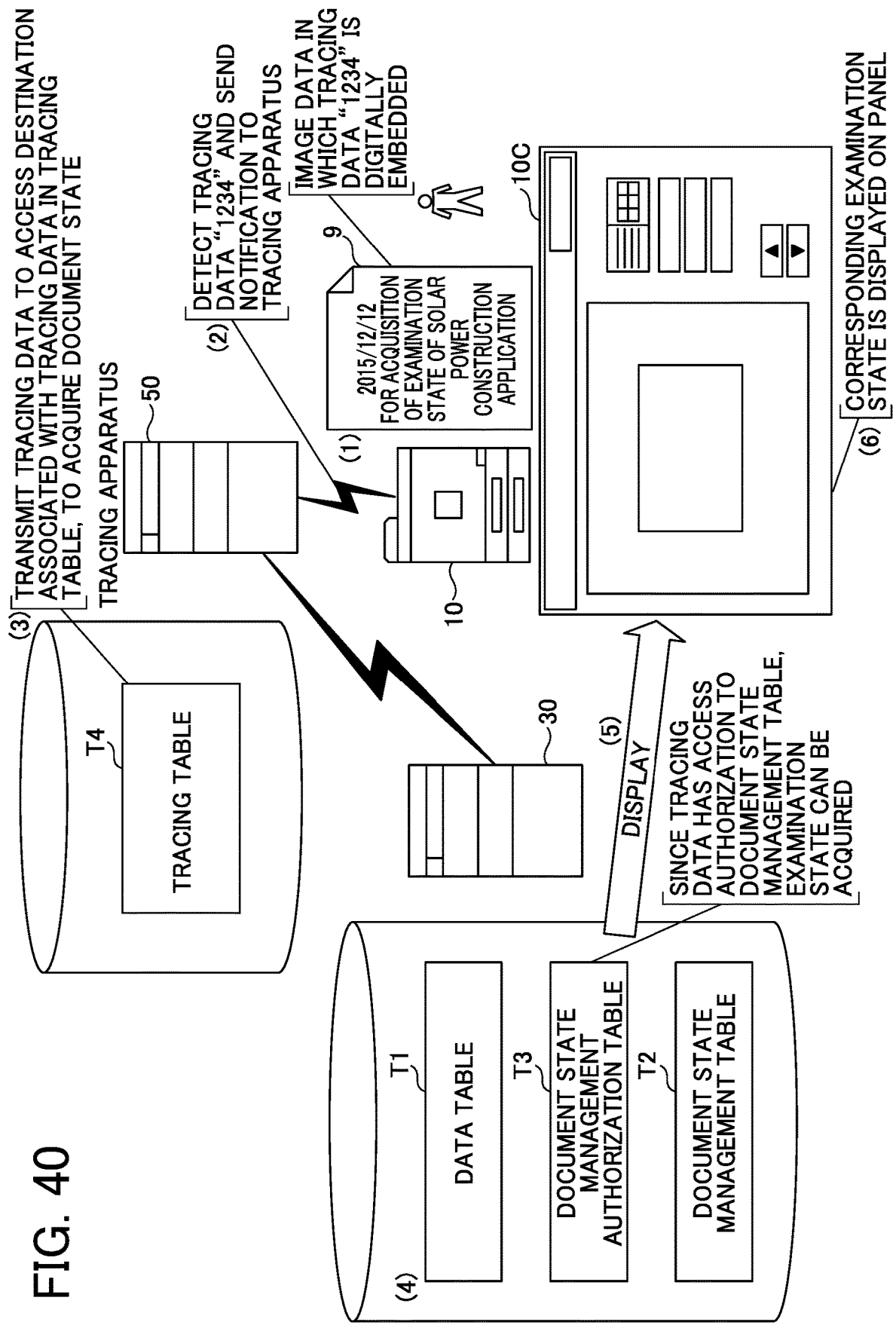
FIG. 40 is an illustration for describing a flow of operation of acquiring an examination status, according to an embodiment of the present disclosure.

FIG. 40 is an illustration for describing a flow of operation of acquiring an examination status, according to the present embodiment.

(1) In order to acquire an examination status, the applicant operates the image processing apparatus 10 to read the application form copy 9 in which the digital watermark is formed.

(2) The image processing apparatus 10 detects tracing data and transmits the tracing data to the tracing apparatus 50.

(3) The tracing apparatus 50 searches the tracing table T4 for the database apparatus 30 as an access destination associated with the tracing data and transmits the tracing data to the database apparatus 30 as the access destination.

(4) The database apparatus 30 acquires a document ID associated with the tracing data from the document state management authorization table T3. Further the database apparatus 30 acquires an examination status associated with this document ID from the document state management table T2.

(5) The database apparatus 30 transmits the examination status to the image processing apparatus 10 via the tracing apparatus 50.

(6) The image processing apparatus 10 displays the received examination status on the touch panel 10c of the image processing apparatus 10.

Summary of Embodiment

As described heretofore, in the present embodiment, tracing data is registered in the document state management authorization table T3, and an examination status is registered in the document state management table T2. The tracing data is formed as a digital watermark on the application form copy 9. The applicant operates the image processing apparatus 10B to cause the image processing apparatus 10 to read the application form copy 9. Accordingly, the document state management authorization table T3 is searched using the tracing data and the examination status is acquired. This enables the applicant to know the examination status without visiting an office of the authorities or the like.

Although the conventional technique enables to specify a document itself, a document state such as a progress of examination is not acquired.

The above described embodiment of the present disclosure provides the document state management system that can acquire a document state.

Variation:

The above-described embodiment is illustrative and do not limit the present disclosure. Thus, numerous additional modifications and variations are possible in light of the above teachings. Any one of the above-described operations may be performed in various other ways, for example, in an order different from the one described above.

For example, although in the present embodiment, the tracing data is printed on the application form copy 9, the tracing data may be stored in any arbitrary storage medium. Examples of the arbitrary storage medium include a universal serial bus (USB) memory or an IC card. In another example, the tracing data may be stored in a terminal apparatus such as a smartphone, a tablet terminal, or a personal computer (PC), each including the arbitrary storage medium built therein. In still another example, the tracing data may be transferred to the applicant by e-mail or the like. In addition, the tracing data may be formed as a digital watermark on any arbitrary paper medium or blank paper other than the application form copy 9.

Further, although in the present embodiment, a description is given of an example of the examination status of the application form, the present disclosure can be suitably applied to a document whose status changes step by step. For example, the present disclosure can be applied to a document whose document state changes among registration, printing, discarding or the like, a document to which processes are performed in order in a workflow, etc.

In the examples of functional configurations illustrated in FIG. 11, FIG. 12 and FIG. 13, processes performed by the image processing apparatus 10, the database apparatus 30, and the tracing apparatus 50 are divided into blocks based on main functions in order to facilitate the understanding of the processes. No limitation is intended by how the processes are divided or by the name of the processes. Further, processes performed by each of the image processing apparatus 10, the database apparatus 30, and the tracing apparatus 50 may be divided to a larger number of processes depending on the contents of processes. Further, one process may be divided to include a larger number of processes.

At least one of the image processing apparatus 10, the database apparatus 30, and the tracing apparatus 50 may be configured as a plurality of server apparatuses to which divided functions are arbitrary allocated. The document state management system 100 may include a plurality of image processing apparatuses 10, database apparatuses 30, and tracing apparatuses 50.

The document state management table T2 is an example of first information. The document state management authorization table T3 is an example of second information. The access log table T5 is an example of third information. The tracing table T4 is an example of fourth information.

Each of the functions of the above-described embodiments may be implemented by one or more processing circuits or circuitry. The processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

What is claimed is:

1. A document state management system, comprising:
   circuitry configured to receive registration of a document; and
   a memory to store first information and second information, the first information retaining identification information of the document in association with a document state relating to the document, the second information retaining tracing data for tracing the document state of the document in association with the identification information of the document, wherein
   the circuitry is further configured to
   record the tracing data in a medium and output the medium in which the tracing data is recorded,
   acquire the tracing data from the medium,
   acquire, from the second information, the identification information of the document associated with the tracing data acquired from the medium,
   acquire, from the first information, the document state of the document associated with the identification information of the document acquired from the second information, and
   output the document state acquired from the first information.

2. The document state management system of claim 1, wherein
   the second information further associates an access authorization relating to an authorization to access the document with the identification information of the document,
   the circuitry registers information indicating that an access to the document is available in the second information in response to receiving the registration of the document, and
   the circuitry acquires the document state when the information indicating that an access is available is registered in the access authorization of the document associated with the tracing data.

3. The document state management system of claim 1, wherein
   the circuitry records, in the medium, communication destination information based on which communication with the document state management system is established, in addition to the tracing data, and outputs the medium in which the communication destination information and the tracing data are recorded,
   the circuitry acquires the tracing data and the communication destination information from the medium, and
   the circuitry refers to the second information using the communication destination information.

4. The document state management system of claim 1, wherein
   the memory stores third information retaining the identification information of the document in association with an access log to the document, and
   the circuitry acquires, from the second information, the identification information of the document associated with the tracing data acquired from the medium, and
   the circuitry acquires, from the third information, the access log to the document associated with the identification information of the document acquired from the second information.

5. The document state management system of claim 4, wherein the access log includes at least one of information indicating how many times the document has been printed, information indicating how many times the document has been edited, and information indicating how many times the document has been copied.

6. The document state management system of claim 1, wherein the circuitry is further configured to
   receive an update of the document state when a procedure relating to the document progresses, and
   update the document state in the second information.

7. The document state management system of claim 3, wherein
   the memory stores fourth information associating the tracing data and the communication destination information with each other,
   the circuitry refers to the fourth information to generate the tracing data and the communication destination information, the tracing data being unique for each communication destination information.

8. The document state management system of claim 1, wherein
   the circuitry executes a preset program in response to acquisition of the tracing data from the medium, and
   the circuitry acquires the document state by executing the preset program.

9. A method of managing a document state, performed by a document state management system, the method comprising:
   receiving registration of a document;
   recording tracing data for tracing a document state of the document in a medium;
   outputting the medium in which the tracing data is recorded;
   acquiring the tracing data from the medium;
   referring a memory storing first information and second information, the first information retaining identification information of the document in association with a document state relating to the document, the second information retaining tracing data for tracing the document state of the document in association with the identification information of the document;

acquiring, from the second information, the identification information of the document associated with the tracing data acquired from the medium;

acquiring, from the first information, the document state of the document associated with the identification information of the document acquired from the second information; and outputting the document state acquired from the first information.

10. A non-transitory computer-readable medium storing a computer-executable program that causes an information processing apparatus to perform a method comprising:

receiving registration of a document;

recording tracing data for tracing a document state of the document in a medium;

outputting the medium in which the tracing data is recorded;

acquiring the tracing data from the medium;

referring a memory storing first information and second information, the first information retaining identification information of the document in association with a document state relating to the document, the second information retaining tracing data for tracing the document state of the document in association with the identification information of the document;

acquiring, from the second information, the identification information of the document associated with the tracing data acquired from the medium;

acquiring, from the first information, the document state of the document associated with the identification information of the document acquired from the second information; and outputting the document state acquired from the first information.

\* \* \* \* \*